US012739606B2

(12) United States Patent
Nevipur et al.

(10) Patent No.: US 12,739,606 B2
(45) Date of Patent: Sep. 15, 2026

(54) METHODS AND ARRANGEMENTS FOR EMERGENCY NOTIFICATION

(71) Applicant: Intel Corporation, Santa Clara, CA (US)

(72) Inventors: Doron Nevipur, Kefar-Saba (IL); Izoslav Tchigevsky, Haifa (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/128,663

(22) Filed: Mar. 30, 2023

(65) Prior Publication Data

US 2023/0239671 A1 Jul. 27, 2023

(51) Int. Cl.
*H04W 4/90* (2018.01)
*H04W 4/029* (2018.01)
*H04W 48/16* (2009.01)
*H04W 84/12* (2009.01)

(52) U.S. Cl.
CPC ............. *H04W 4/90* (2018.02); *H04W 4/029* (2018.02); *H04W 48/16* (2013.01); *H04W 84/12* (2013.01)

(58) Field of Classification Search
CPC ....... H04W 4/90; H04W 84/12; H04W 48/16; H04W 76/50; H04W 4/029; H04W 8/005; H04W 12/63; H04W 12/61; H04W 24/00; H04W 28/06; H04W 64/00; Y02D 30/70; G01S 1/68; G08B 25/016; H04L 1/08; H04M 1/72424
See application file for complete search history.

(56) References Cited

U.S. PATENT DOCUMENTS

2008/0298333 A1* 12/2008 Seok .................... H04W 8/005 370/338
2018/0206193 A1* 7/2018 Adachi ............ H04W 52/0235
2023/0403739 A1* 12/2023 Baek ................ H04W 74/0875

* cited by examiner

*Primary Examiner* — Lester G Kincaid
(74) *Attorney, Agent, or Firm* — KDW FIRM PLLC

(57) ABSTRACT

Logic to generate emergency notification frames comprising a beacon frame, a probe response frame, and a probe request frame, wherein each of the emergency notification frames comprise a user info element, the user info element comprising a user location field, the user location field comprising a value to identify a current geolocation of the device. Logic to scan multiple channels of one or more bands for communications associated with access point (AP) stations (STAs) to identify active channels. Logic to repeatedly cause transmission of the emergency notification frames for a predetermined time period on each of the active channels, wherein presence of the user info element in each of the three emergency notification frames is a signal for a recipient STA to invoke an emergency notification protocol to cause the recipient STA to retransmit user information in the user info element in a subsequent emergency notification message.

20 Claims, 12 Drawing Sheets

FEM CIRCUITRY 1400
TO RADIO IC 1407
FROM RADIO IC 1409
1406
1406
1406
1410
1410
1410
2.4
5
6
FILTER 1412
FILTER 1412
FILTER 1412
DUPLEXER 1404
DUPLEXER 1414
TX/RX SWITCH 1402
1403
1415
FRONT END MODULE CIRCUITRY 1404A
TO/FROM ANTENNA

TO BASEBAND PROCESSING CIRCUITRY 1507
FROM BASEBAND PROCESSSING CIRCUITRY 1511
FILTER 1508
1506
1502
1505
SYNTHESIZER 1504
1505
1514
FILTER 1512
RADIO IC CIRCUITRY 1506A
FROM FRONT END MODULE 1407
TO FRONT END MODULE 1409

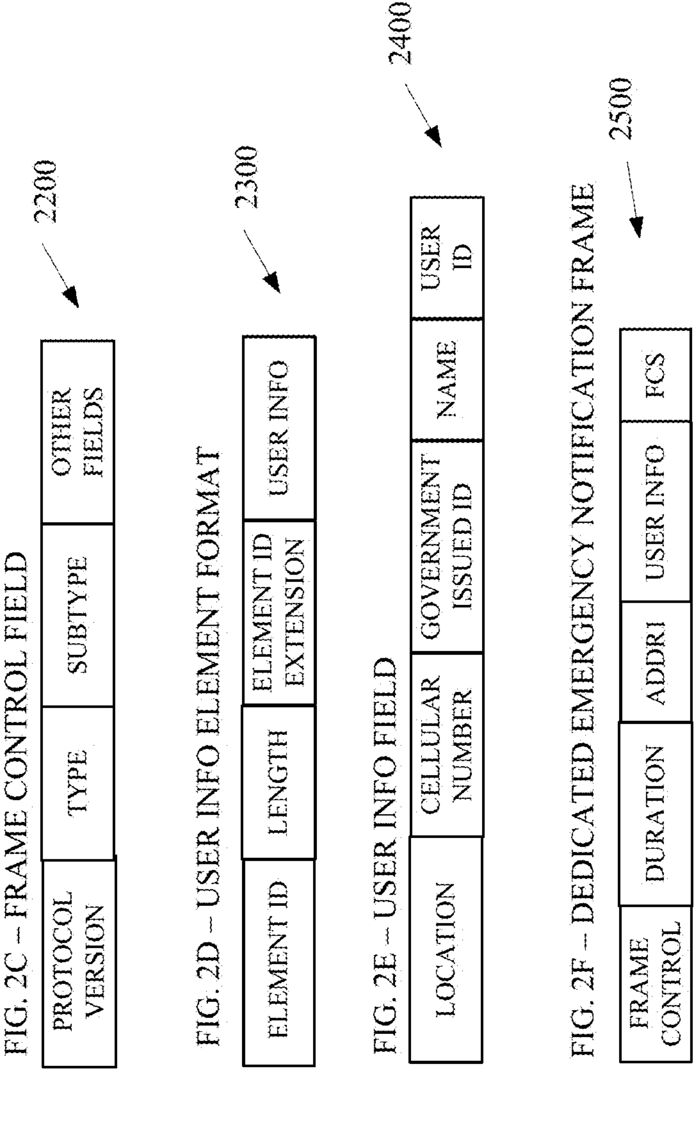
FIG. 2C – FRAME CONTROL FIELD
2200
PROTOCOL VERSION
TYPE
SUBTYPE
OTHER FIELDS
FIG. 2D – USER INFO ELEMENT FORMAT
2300
ELEMENT ID
LENGTH
ELEMENT ID EXTENSION
USER INFO
FIG. 2E – USER INFO FIELD
2400
LOCATION
CELLULAR NUMBER
GOVERNMENT ISSUED ID
NAME
USER ID
FIG. 2F – DEDICATED EMERGENCY NOTIFICATION FRAME
2500
FRAME CONTROL
DURATION
ADDR1
USER INFO
FCS

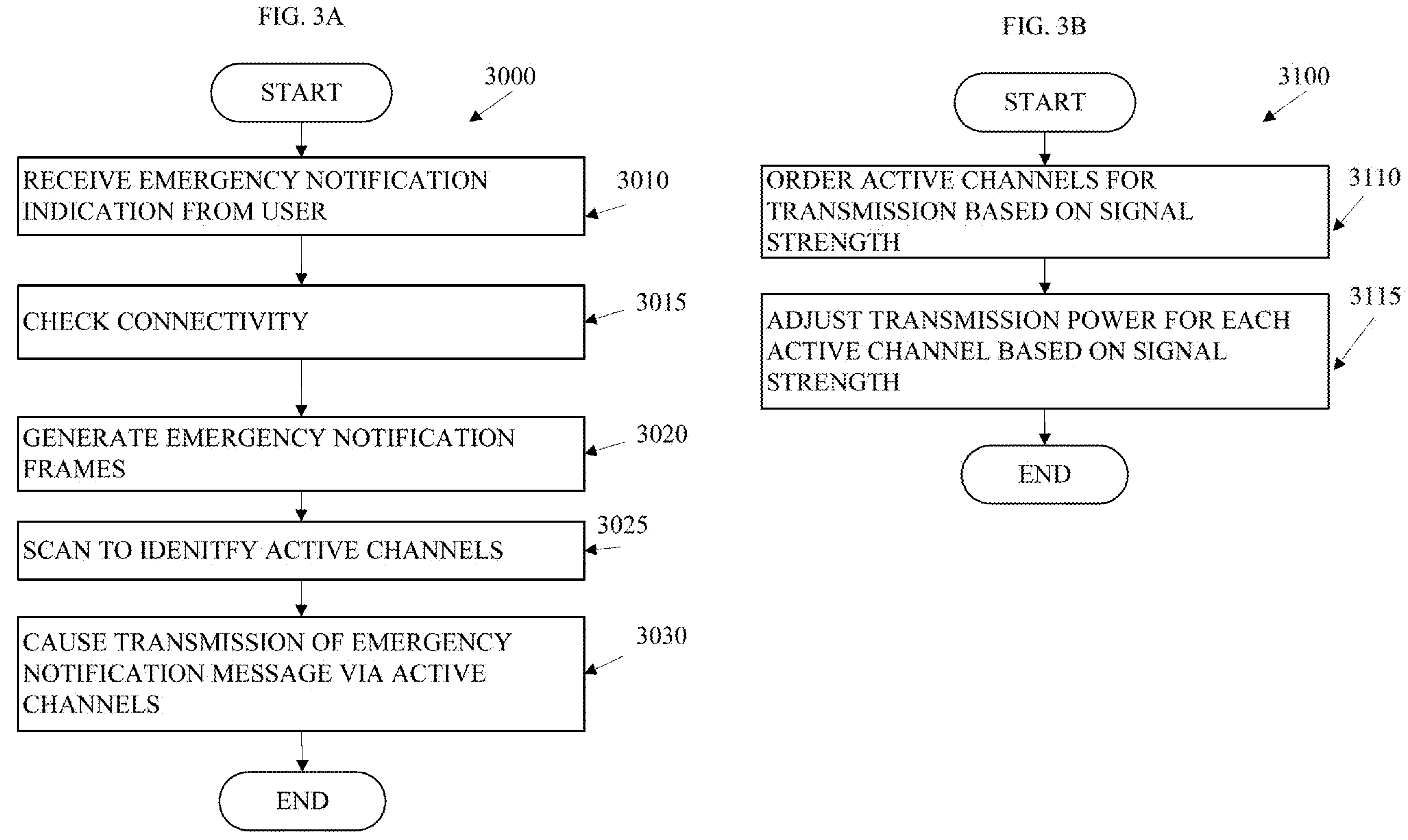
FIG. 3A
START
3000
RECEIVE EMERGENCY NOTIFICATION INDICATION FROM USER
3010
CHECK CONNECTIVITY
3015
GENERATE EMERGENCY NOTIFICATION FRAMES
3020
SCAN TO IDENITFY ACTIVE CHANNELS
3025
CAUSE TRANSMISSION OF EMERGENCY NOTIFICATION MESSAGE VIA ACTIVE CHANNELS
3030
END
FIG. 3B
START
3100
ORDER ACTIVE CHANNELS FOR TRANSMISSION BASED ON SIGNAL STRENGTH
3110
ADJUST TRANSMISSION POWER FOR EACH ACTIVE CHANNEL BASED ON SIGNAL STRENGTH
3115
END

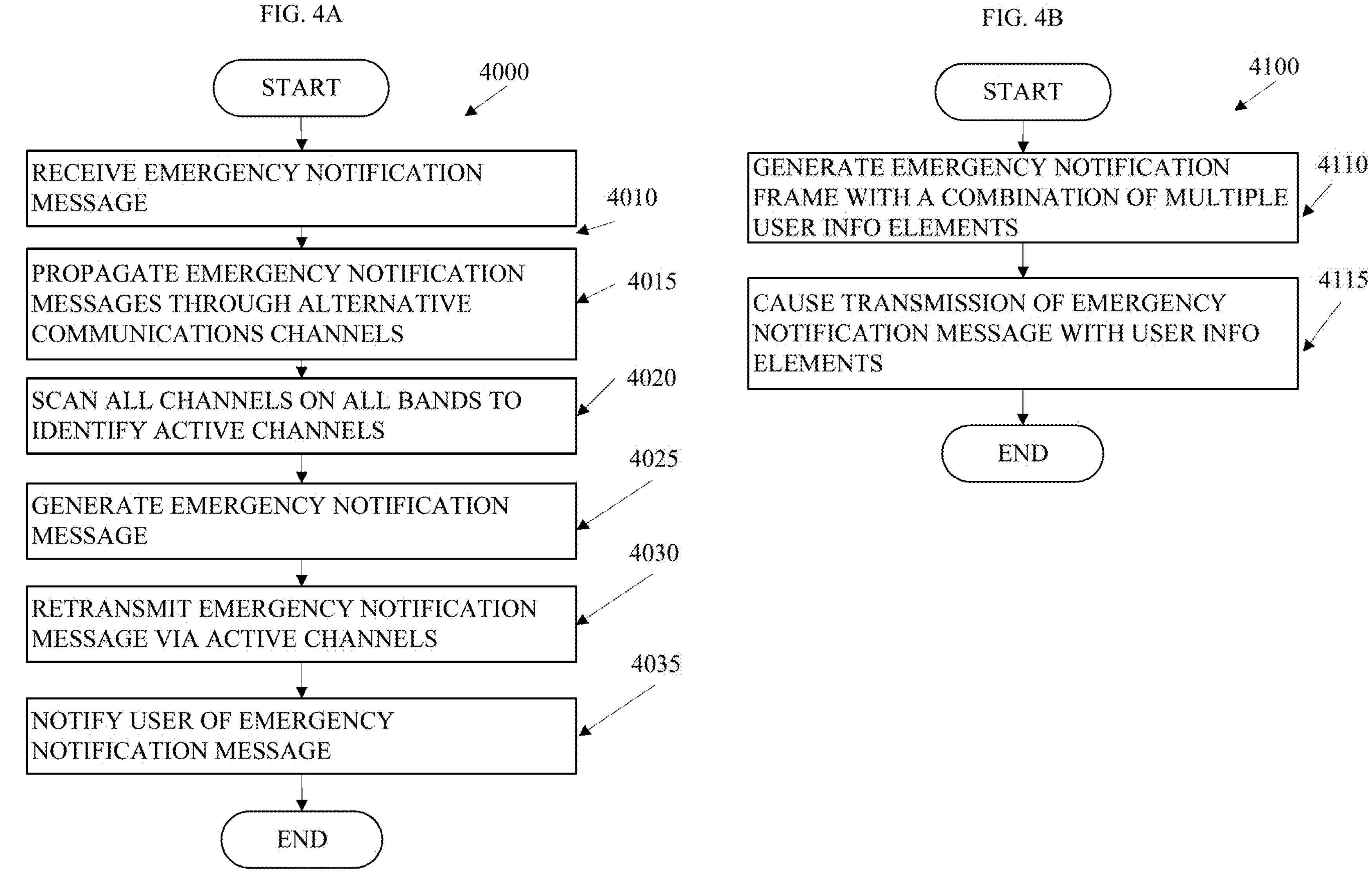
FIG. 4A
4000
START
RECEIVE EMERGENCY NOTIFICATION MESSAGE
4010
PROPAGATE EMERGENCY NOTIFICATION MESSAGES THROUGH ALTERNATIVE COMMUNICATIONS CHANNELS
4015
SCAN ALL CHANNELS ON ALL BANDS TO IDENTIFY ACTIVE CHANNELS
4020
GENERATE EMERGENCY NOTIFICATION MESSAGE
4025
RETRANSMIT EMERGENCY NOTIFICATION MESSAGE VIA ACTIVE CHANNELS
4030
NOTIFY USER OF EMERGENCY NOTIFICATION MESSAGE
4035
END
FIG. 4B
4100
START
GENERATE EMERGENCY NOTIFICATION FRAME WITH A COMBINATION OF MULTIPLE USER INFO ELEMENTS
4110
CAUSE TRANSMISSION OF EMERGENCY NOTIFICATION MESSAGE WITH USER INFO ELEMENTS
4115
END

METHODS AND ARRANGEMENTS FOR EMERGENCY NOTIFICATION

TECHNICAL FIELD

This disclosure generally relates to methods and arrangements for wireless communications and, more particularly, for emergency notification via wireless communications.

BACKGROUND

Mobile devices such as mobile phones and watches with Wi-Fi capabilities and cellular capabilities have become ubiquitous. Mobile users typically have access to Wi-Fi services, cellular data services, and cellular phone services with the exception of some remote locations and certain situations such as emergency situations. Most of the devices within possession of a person during an urgent situation will likely have Wi-Fi capabilities such as a mobile phone, wearable device, portable game console, tablet, personal computer, etc.

In cases of emergency, for instance, prompt reporting to a rescue authority or nearby people to ask help may be crucial and the speed with which such persons or entities are made aware of the emergency may be a critical factor in the outcome of the person(s) involved, possibly determining the life or death of such person(s). However, in some emergency situations, it is possible that some of normal or common reporting capabilities may not be available. For example, during natural disasters, cellular services and Wi-Fi infrastructure may be unavailable. Furthermore, cellular technology may not be available in many places, both in rural environments and indoors, like subways, metros, or garages; so it is important to utilize all technical tools that are available to the person(s) affected by the emergency situation to try to deliver emergency notifications to someone that can help.

BRIEF DESCRIPTION OF THE DRAWINGS

FIG. 2C depicts an embodiment of a frame control field to implement emergency logic circuitry.

FIG. 2D depicts an embodiment of a user info element.

FIG. 2E depicts an embodiment of a user info field.

FIG. 2F depicts another embodiment of a dedicated emergency notification frame.

FIG. 3A depicts an embodiment of a flowchart for an originator station to implement emergency logic circuitry.

FIG. 3B depicts another embodiment of a flowchart for optimizations to implement emergency logic circuitry.

FIG. 4A depicts another embodiment of a flowchart for a recipient station to implement emergency logic circuitry.

FIG. 4B depicts another embodiment to flowchart for compilation of user info to implement emergency logic circuitry.

DETAILED DESCRIPTION OF EMBODIMENTS

Figure 1A:
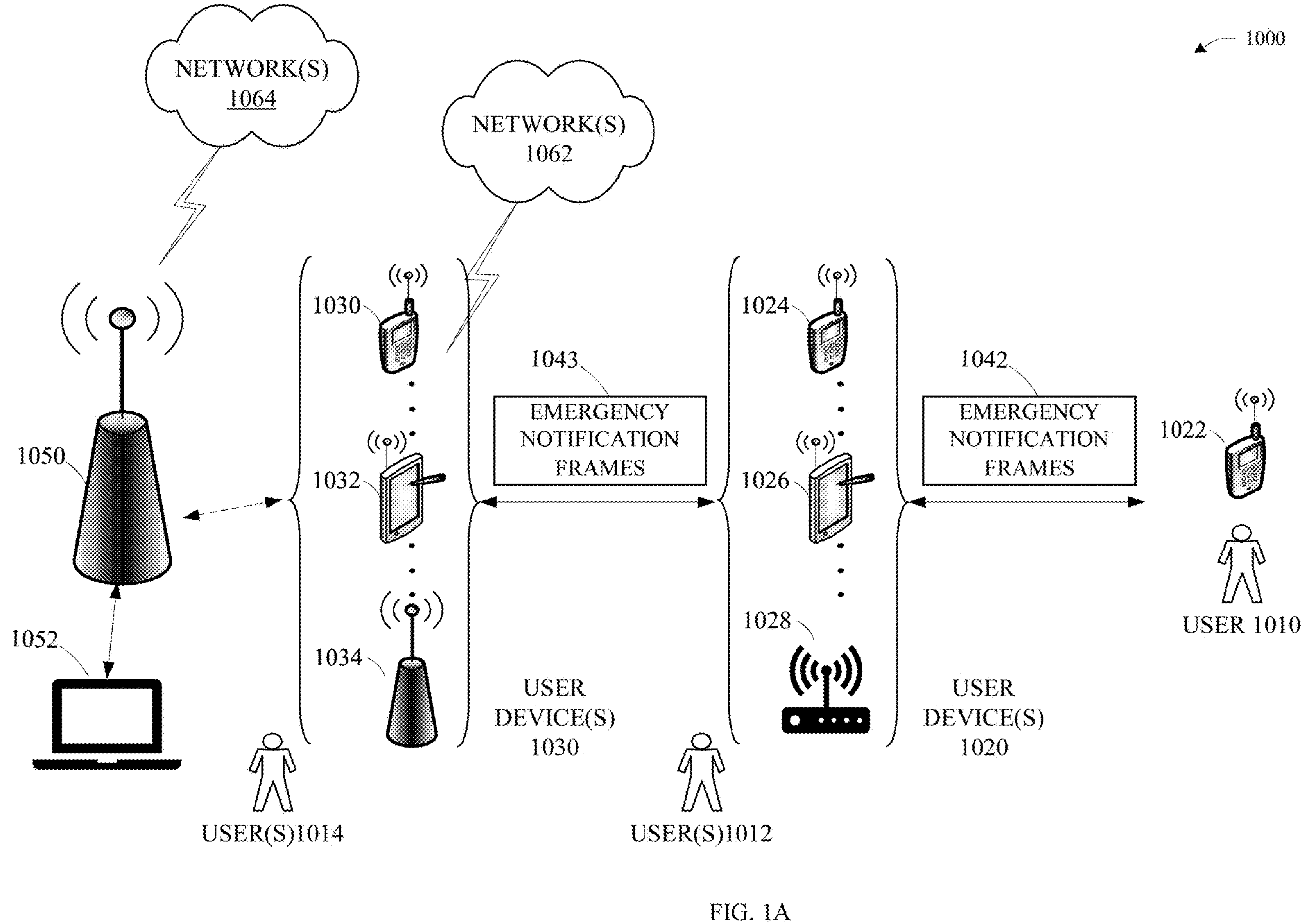
FIG. 1A is a system diagram illustrating an embodiment of a network environment for emergency logic circuitry, in accordance with one or more example embodiments.

The following description and the drawings sufficiently illustrate specific embodiments to enable those skilled in the art to practice them. Other embodiments may incorporate structural, logical, electrical, process, algorithm, and other changes. Portions and features of some embodiments may be included in, or substituted for, those of other embodiments. Embodiments set forth in the claims encompass all available equivalents of those claims.

Embodiments may facilitate emergency notification communications via Wi-Fi in accordance with different versions of Institute of Electrical and Electronics Engineers (IEEE) 802.11 standards for wireless communications such as IEEE P802.11bi, P802.11be™/D3.0, January 2023; IEEE 802.11-2020, December 2020; IEEE P802.11REVmd/D2.1, February 2019; IEEE P802.11ax™-2021, May 2021; IEEE P802.11ay™-2021, July 2021; IEEE P802.11az™/D3.0, IEEE P802.11ba™-2021, October 2021; IEEE P802.11bb™/D0.4, IEEE P802.11bc™/D1.02, and IEEE P802.11bd™/D1.1.

Several embodiments comprise stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Embodiments may facilitate wireless communications in accordance with multiple standards. Some embodiments may comprise low power wireless communications like Bluetooth®, cellular communications in accordance with 3GPP technical specifications, and messaging systems such as Short Messaging Service (SMS). Furthermore, some wireless embodiments may incorporate a single antenna while other embodiments may employ multiple antennas or antenna elements.

Embodiments may address emergency notification by defining emergency notification messages including frames and/or subelements and protocols for Wi-Fi to, advantageously, provide a mechanism for communicating emergency notifications when common means of communication are unavailable. Embodiments may include emergency logic circuitry in Wi-Fi devices, referred to herein as stations (STAs), to define emergency notification messages and protocols for transmitting, receiving, and recommunicating information in the emergency notification messages such as user information of at least the STA of the user that originates the emergency notification message (originator STA) with the goal of communicating the emergency notification message to a rescue authority and/or other Wi-Fi devices (referred to herein as recipient STAs) users that can assist user of the originator STA. In some embodiments, the user information in the emergency notification message may include, e.g., the geolocation of the originator STA as well as other user information such as the name of the user, government issued identifier (ID) number of the user, a phone number for the user, an address for the user, an email address for the user, a user ID associated with the user, and/or the like. In some embodiments, the content of the user information may be determined by the manufacturer, the software developer, the vendor, and/or the user, and may be dependent on the country and/or geographical area of the location of the originator STA.

Embodiments may take advantage of typical activities performed by potential recipient STAs, in an area proximate to the originator STA. Typical activities of recipient STAs may include an explicit client scan for access point (AP) STAs, occasional receive for connected client STAs, receive by AP STAs, and periodic scan by AP STAs.

In reference to the Explicit Client Scan for AP STAs, client STAs (recipient STAs) that are not connected (or associated) with an AP STA usually perform scans every 60 seconds on all available channels. Client STAs may perform a receive operation for 10-20 milliseconds on an active channel after sending a probe request frame and may perform a receive operation for 100 milliseconds on “passive” channel. Such receive operations may seek packets that are beacon frames and probe response frames.

In reference to the Occasional Receive for Connected clients, client STAs (recipient STAs) that are connected or associated with AP STAs may perform a receive operation for beacon frames from the associated AP STA with every beacon or delivery traffic map (DTIM) interval, which may usually be set to 100 milliseconds (ms). In addition, client STAs may perform receive operations for usual Wi-Fi activities. If during that time, the client STA receives a beacon frame or probe response frame, the client STA may process the packet. This activity happens only on the channel(s) associated with link between the client STA and the associated AP STA.

In reference to the Receive by AP STAs, the majority of AP STAs (recipient STAs) are always receiving on the AP STAs’ service channels. For instance, Dual Band AP STAs may continuously perform receive operations on the Dual Band AP STAs’ service channels in both bands. These Dual Band AP STAs may seek packets from unassociated client STAs that are probe request frames. Some AP STAs may also seek beacon frames from other AP STAs within the same basic service set (BSS) or extended service set (ESS) to evaluate a channel load on service channels of the AP STA.

In reference to the Periodic scan by AP STAs, some AP STAs (recipient STAs) perform periodic scans for alternative service channels that will be less loaded than the current one. This is infrequent action and AP STAs process beacon frames that are received at this mode.

In some embodiments, emergency logic circuitry of the originator STA may transmit an emergency notification message in the form of a medium access control (MAC) emergency notification frame such as a beacon frame, a probe request frame, and/or a probe response frame to take advantage of the fact that recipient STAs typically scan for or seek the beacon frames, probe request frames, and/or probe response frames. For instance, client STAs seek beacon frames or probe response frames every, e.g., 60 seconds so, in some embodiments, the emergency logic circuitry may repeatedly transmit beacon frames, probe request frames, and probe response frames for, e.g., 60 seconds or more on each active channel to increase the likelihood that recipient STAs may detect and receive at least one of the beacon frames, probe request frames, or probe response frames for evaluation.

In some embodiments, in accordance with regulations of one or more countries, emergency logic circuitry may transmit emergency notification messages at higher transmission powers than transmission power limits of normal Wi-Fi communications. In further embodiments, in accordance with regulations of one or more countries, emergency logic circuitry may transmit emergency notification messages at higher transmission powers than specified by other regulations for normal Wi-Fi communications such as the regulations related to specific absorption rate (SAR).

In some embodiments, emergency logic circuitry of an originator STA and a recipient STA may follow an emergency notification protocol established for emergency notification messages. The emergency notification protocol may apply to original emergency notification messages transmitted by an originator STA as well as re-transmitted or recommunicated emergency notification messages by a recipient STA. The emergency notification protocol may involve scanning all channels on all bands for Wi-Fi activity (in accordance with regulations), repeatedly transmitting one or more or all emergency notification frames in rotation for at least e.g., 60 seconds (or other predetermine time period) on each channel where Wi-Fi activity is detected, repeatedly transmitting one or more or all emergency notification frames in rotation for at least, e.g., 60 seconds on each channel of channels 1, 6, and 11 of the lower band even if Wi-Fi activity was not detected on one or more of the channels 1, 6, and 11 of the lower band, and repeat this process until the user of the emergency notification originator STA explicitly stops or terminates the emergency notification protocol.

Note that the at least 60 seconds of repetition may be a tunable number that can be less than or more than 60 seconds; may be determined by the manufacturer, the software developer, the vendor, and/or the user; and may be dependent on the country and/or geographical area of the location of the originator STA and/or the recipient STA. For instance, 60 seconds may be a predetermined time period or default setting for the emergency notification protocol but the time period may be updated at a later time through a firmware update, a software update, and/or a user preference in response to, e.g., updated optimizations, changes in technology, and/or to conform to new or updated regulations. Furthermore, the at least 60 seconds is based on a typical time period for which an unassociated client STA may scan, either actively or passively, on all available channels on one or more bands. The typical time period may vary depending on the number and types of recipient STAs located in a particular geographical location and/or generally for multiple or all locations.

For example, the predetermined minimum time period may be between 55 seconds and 65 seconds to account for different estimations of the typical time period for scanning. In some embodiments, the predetermined time period may take into account types of client STAs found in more localized geographical locations so such estimations may vary between 50 seconds and 70 seconds or 45 seconds and 75 seconds due to the variations in the concentrations of certain types of recipient STAs found in each locality.

In some embodiments, the emergency notification logic circuitry may implement optimizations, in accordance with the emergency notification protocol, to prioritize channels on which Wi-Fi activity is detected based on a signal strength indicator such as a received signal strength indicator (RSSI). In further embodiments, emergency logic circuitry of an originator STA or a recipient STA may adjust a transmission range for the emergency notification frame based on, e.g., the RSSI in accordance with the emergency notification protocol. For instance, the emergency logic circuitry may adjust the transmission power based on the RSSI and/or adjust the number of repetitions of physical layer (PHY) preamble fields, PHY header field(s), and/or PHY data fields based on the RSSI. For example, if the RSSI is above a first threshold level on channel 1, the emergency logic circuitry may reduce the transmission power of the emergency notification frame for channel 1 from the maximum power level to a first transmission power level. If the if the RSSI is above a second threshold level on channel 1, the emergency logic circuitry may reduce the transmission power of the emergency notification frame for channel 1 from the maximum power level to a second transmission power level. If the if the RSSI is above a third threshold level on channel 1, the emergency logic circuitry may reduce the transmission power of the emergency notification frame for channel 1 from the maximum power level to a third transmission power level. The number of thresholds for setting the transmission power level may be determined by the manufacturer, the software developer, the vendor, and/or the user, and may be dependent on the country and/or geographical area of the location of the originator STA or recipient STA.

In some embodiments, in accordance with the emergency notification protocol, the emergency logic circuitry may perform other transmission optimizations to increase the range of transmission of the emergency notification message. For instance, the other transmission optimizations may include transmission at a maximum transmission power or up to a maximum transmission power in accordance with transmission power regulations, transmit the emergency notification message with a direct sequence spread spectrum (DSSS) PHY and complimentary code keying (CCK) modulation (DSSS/CCK) at a data rate of one megabits per second or two megabits per second, include data symbol repetition, include PHY header symbol repetition, include PHY preamble symbol repetition, and/or include the highest guard intervals in accordance with an applicable IEEE 802.11 standard such as 3.2 microseconds for data symbol guard intervals in IEEE 802.11ax-2021.

Note that the emergency logic circuitry of originator STA and the recipient STA may perform a clear channel assessment (CCA), perform backoff offsets after detection, and include a short interframe space (SIFS) or other interframe space (IFS) between transmissions in accordance with the IEEE. 802.11-2020 standard and/or other Wi-Fi standards or specifications. In some embodiments, the emergency logic circuitry may also add additional delays between retransmissions or recommunication of the emergency notification messages. For instance, in some embodiments, when battery power is low for an originator STA or a recipient STA, the emergency logic circuitry may access a setting or a preference that may to determine whether to add delays into the emergency notification protocol such as between transmissions of each type of emergency notification frames or between repetitions of the entire transmission process from scanning through transmission of the emergency notification frames.

In some embodiments, the emergency logic circuitry may, in accordance with the emergency notification protocol, advantageously improve a probability of delivery to a rescue authority or other persons that can assist. For instance, recipient STAs may:

(1) spread the emergency notification message to the rescue authorities using all available connection capabilities (including e.g., cellular E911 call, short message service (SMS) text, wireless/wired Internet connection);

(2) propagate further the emergency notification message using the emergency notification Wi-Fi protocol; and/or (3) if message received by personal device (such as phone tablet or PC)-notify the owner of the of the device, that someone needs help nearby.

Note that a first originator STA or a first recipient STA may receive an emergency notification message from a second originator STA or from a second recipient STA. In some embodiments, the emergency logic circuitry of the first originator STA and/or the first recipient STA may concatenate or otherwise combine non-repetitious user info elements (or user info fields) into a single emergency notification frame for transmission in accordance with the emergency notification protocol. In other embodiments, the emergency logic circuitry of the first originator STA and/or the first recipient STA may combine the user information from multiple, non-repetitious user info elements into a single user info element (or user info field) for transmission in an emergency notification frame.

Note that devices that have Wi-Fi capabilities are typically referred to as STAs. STAs may be access point (AP) STAs or non-AP STAs. AP STAs may implement code in the form of firmware, microcode, and/or software to perform AP functionality or operations. STAs that are not specifically designed to operate as an AP are also referred to as SoftAPs but are considered to be AP STAs for the discussions herein.

Some STAs may be part of a multi-link device (MLD). A MLD may comprise more than one STAs, each STA of the MLD may be associated with a specific link of an MLD and include a MLD level management entity referred to as a multi-MAC (medium access control) STA management entity (MM-SME) that coordinates communications between STA management entities (SMEs). Each STA of a MLD may operate on a different band or carrier frequency.

Some STAs may be part of multi-band devices that are not MLDs. Multi-band devices such as dual-band devices or tri-band devices may include a STA that operates on different bands but the STA may only establish a connection or association with an AP STA or another STA via a single band. For instance, a dual band smart phone may have, e.g., a STA that can check a 2.4 GHz band and a 5 GHz band for the best available throughput at the time of association with an AP STA but may choose to either connect via the 2.4 GHz band or the 5 GHz band but not both. A MLD with a 2.4 GHz band and a 5 GHz band may have a STA for each band and may connect with an AP MLD or another MLD via both bands and communicate via both bands.

For instance, a smart phone may be a MLD or a multi-band STA and may operate on a 2.4 gigahertz (GHz) carrier frequency, a 5 GHz carrier frequency, and a 6 GHz carrier frequency. If the smart phone is an MLD, the smart phone may form associations to operate on all three bands concurrently. If the smart phone is a multi-band device, the smart phone may choose one of the bands for Wi-Fi communications.

Note that the forementioned carrier frequencies are examples of typical operating frequencies for STAs but STAs can be capable of communications via any combination of available frequencies. Note also that specific definitions of the carrier frequencies (the range of acceptable frequencies of operation) may be specified in regulations of the country or countries within which the STAs are designed to operate and may also vary based on private licenses that may be obtained by private entities for specific locations such as industrial or manufacturing facilities or offices. In certain embodiments, STAs may comprise a radio component that operates in cooperation with the communications antennas to communicate via 2.4 GHz channels (e.g., 802.11b, 802.11g, 802.11n, 802.11ax, 802.11be), 5 GHz channels (e.g., 802.11n, 802.11ac, 802.11ax, 802.11be), 6 GHz (e.g., 802.11be), or 60 GHz channels (e.g., 802.11ad, 802.11ay, Next Generation Wi-Fi) or 800 MHz channels (e.g., 802.11ah). In some embodiments, the STAs may operate at 28 GHz, 40 GHz, or any carrier frequency between 45 GHz and 75 GHz. It should be understood that this list of communication channels and carrier frequencies is only a partial list, and that other 802.11 standards may be used (e.g., Next Generation Wi-Fi, or other standards).

Note also that a MLD can include AP functionality for one or more STAs and thus one or more links associated with the MLD. If a STA of the MLD operates as an AP in a link, the STA is referred to as an AP STA. If the STA does not perform AP functionality, or operate as an AP, on a link, the STA is referred to as a non-AP STA. In many of the embodiments, the AP MLDs operate as APs on active links, and the non-AP MLDs operate as non-AP STAs on active links. However, an AP MLD may also have STAs that operate as non-AP STAs on the same extended service set (ESS) or basic service set (BSS) or other ESS's or BSS's.

Note that for discussions below, STAs may be part of MLDs, part of multi-band devices, or may operate on a single band unless otherwise specified.

The above descriptions are for purposes of illustration and are not meant to be limiting. Numerous other examples, configurations, processes, algorithms, etc., may exist, some of which are described in greater detail below. Example embodiments will now be described with reference to the accompanying figures.

Various embodiments may be designed to address different technical problems associated with communicating an emergency notification messages; lack of Wi-Fi infrastructure; distance from emergency location to available communications infrastructure; defining an emergency notification protocol; defining frames for emergency notification messages; defining an emergency protocol to improve chances that emergency notification messages are received and processed; improving chances that Wi-Fi devices are present on Wi-Fi channels; improving chances that Wi-Fi devices are present on Wi-Fi bands; improving the range of transmission of emergency notification messages; defining information to communicate in emergency notification messages; and/or the like.

Different technical problems such as those discussed above may be addressed by one or more different embodiments. Embodiments may address one or more of these problems associated with communicating an emergency notification messages. For instance, some embodiments that address problems associated with communicating emergency notification messages may do so by one or more different technical means, such as, such as utilizing commonly processed frames for recipient STAs; identifying recipient STAs to target; defining content of emergency notification messages; defining protocols for emergency notification; defining optimizations for transmissions of emergency notification messages; defining optimizations for selecting channels and bands for emergency notification messages; defining timing of emergency notification messages to improve chances of receipt and processing of the emergency notification messages; defining types and subtypes of emergency notification messages to improve chances of receipt and processing of the emergency notification messages; defining physical layer (PHY) protocols for emergency notification messages; defining modulation and data rates for emergency notification messages; defining emergency notification protocols for recipient STAs; defining frames, subelements, and/or fields for emergency notification messages; and/or the like.

Several embodiments of originator STAs and/or recipient STAs comprise central servers, access points (APs), and/or stations (STAs) such as modems, routers, switches, servers, workstations, netbooks, mobile devices (Laptop, Smart Phone, Tablet, and the like), sensors, meters, controls, instruments, monitors, home or office appliances, Internet of Things (IoT) gear (watches, glasses, headphones, and the like), and the like. Some embodiments may provide, e.g., indoor and/or outdoor "smart" grid and sensor services. In various embodiments, these devices relate to specific applications such as healthcare, home, commercial office and retail, security, and industrial automation and monitoring applications, as well as vehicle applications (automobiles, self-driving vehicles, airplanes, and the like), and the like.

Embodiments may facilitate wireless communications in accordance with multiple standards. Some embodiments may comprise wireless communications like Bluetooth®, cellular communications, and messaging systems. Furthermore, some wireless embodiments may incorporate a single antenna while other embodiments may employ multiple antennas or antenna elements.

While some of the specific embodiments described below will reference the embodiments with specific configurations, those of skill in the art will realize that embodiments of the present disclosure may advantageously be implemented with other configurations with similar issues or problems.

FIG. 1A system diagram illustrating an embodiment of a network environment for emergency logic circuitry. Wireless network 1000 may include a user 1010 with an originator STA 1022, one or more user device(s) 1020 (recipient STAs), one or more user device(s) 1030 (recipient STAs), an AP STA 1050 (recipient STA), and a rescue authority device 1052 (recipient STA), which may communicate in accordance with IEEE 802.11 communication standards and/or other standards or technical specifications. The user device(s) 1020 and user device(s) 1030 may comprise Wi-Fi devices that are non-stationary (e.g., not having fixed locations) and/or stationary devices.

The AP STA 1050 may be a station (STA) with a distribution system access function (DSAF). The AP STA 1050 may provide access for the user devices 1020 to the distribution system services, via the wireless medium (WM) for associated STAs such as user device(s) 1030. For example, a user 1010 may have a mobile device, originator STA 1022, with Wi-Fi capabilities and may initiate an emergency notification protocol. The emergency notification protocol may be initiated via voice, a touch screen, or automatically via assessment by code executing on the originator STA.

At the current location of the user 1010, the originator STA 1022 may not have access to a cellular network or a Wi-Fi network due to distances from cell towers or Wi-Fi AP STAs but the user 1010 may require help due to an emergency. Emergency logic circuitry of the originator STA 1022 may scan all channels and bands within the capabilities of the originator STA 1022 and within regulations associated with the geographical location associated with the originator STA 1022. The scans may include active scans and/or passive scans for each of the channels on each of the bands to detect activity on the channels. Activity may involve receipt of energy at an antenna of the originator STA 1022 that is above a threshold energy level associated with noise and, in some embodiments, may involve receipt of communications such as beacon frames, probe request frames, probe response frames, and/or other MAC frames. Based on the receipt of physical layer (PHY) preambles, the originator STA 1022 may determine a signal strength such as a receive signal strength indicator (RSSI) for each of the channels. The RSSI may comprise a value in the range of 0-255 that is assessed based on energy detected at an energy detector of the PHY of the originator STA 1022 during receipt of the PHY preamble. If the energy detector detects energy but does not receive a PHY protocol data unit (PPDU), the RSSI may be a low number such as zero. If the PHY receives a PPDU, the RSSI may be a number between 1 and 255.

For each channel that received a PPDU, the emergency logic circuitry may identify the channel as an active channel. In many embodiments, the emergency logic circuitry of the originator STA 1022 may also include channels 1, 6, and 11 of the lower band such as 2.4 GHz as active channels even if the originator STA 1022 did not receive a PPDU on the channels 1, 6, and 11 because these channels are commonly used channels in the lower band.

After scanning the channels to determine a set of active channels, in some embodiments, the emergency logic circuitry of the originator STA 1022 may prioritize the active channels. Prioritization of the active channels may involve ordering the channels based on the signal strength of activity detected on the channels. In some embodiments, the channels 1, 6, and 11 of the lower band such as 2.4 GHz are added to the list of active channels even if no activity is detected on these channels during the scans. If no activity is detected on the channels 1, 6, and 11 of the lower band, then these channels may have the lowest priority and, thus, be added last in the list of active channels for transmission of emergency notification frames. Otherwise, the channels will be included in the list in an order based on the signal strength detected for the channels.

In some embodiments, the emergency logic circuitry of the originator STA 1022 may perform transmission range optimizations to increase the range of transmission for emergency notification frames. The transmission range optimizations may include adjustment of the transmission power for the emergency notification frames, applying direct sequence spread spectrum (DSSS) with complimentary code keying (CCK) modulation and to transmission of the emergency notification frames, setting the data rate to one megabits per second, applying data symbol repetition, applying PHY preamble symbol repetition, applying header symbol repetition, setting a data symbol guard interval to a maximum guard interval in accordance with a corresponding IEEE 802.11 standard such as 3.2 microseconds for IEEE 802.11ax-2021, setting other guard intervals to a maximum in accordance with a corresponding IEEE 802.11 standard, and/or the like. The one or more transmission range optimizations may be set by default in accordance with applicable regulations, which may be based on the country of the location of the originator STA 1022 or the country of origin of the originator STA 1022.

In some embodiments, the emergency logic circuitry of the originator STA 1022 may also adjust the transmission power for transmitting emergency notification frames for each of the active channels. For instance, the emergency logic circuitry of the originator STA 1022 may, as a default, set the transmission power to the maximum power available in accordance with regulations associated with transmission on a frame on each channel. In some embodiments, the regulations may allow a higher transmission power for emergency notification frames on one or more of or all the active channels. For embodiments that adjust the transmission power level for each channel, the emergency logic circuitry of the originator STA 1022 may adjust the power in accordance with an algorithm or based on a set of threshold levels based on the signal strength detected on each active channel, such as the RSSIs for each channel. In such embodiments, the emergency logic circuitry of the originator STA 1022 may adjust the transmission power to a low transmission power level for high signal strengths and at a high transmission power level for low level signal strengths.

In some embodiments, the emergency logic circuitry of the originator STA 1022 may also adjust the transmission power for transmitting emergency notification frames for each of the active channels. For instance, the emergency logic circuitry of the originator STA 1022 may reduce the transmission power from the maximum allowable transmission power to a lower transmission power for an active channel with a high RSSI such as greater than 175, greater than 150, greater than 125, or greater than 100.

Before, after, or concurrently with scanning for active channels, the emergency logic circuitry of the originator STA 1022 may generate three or more MAC frames as emergency notification frames 1042. In many embodiments, the emergency logic circuitry of the originator STA 1022 may generate a beacon frame, a probe request frame, and a probe response frame as emergency notification frames for transmission. In some embodiments, the originator STA 1022 may generate a fourth emergency notification frame that is a dedicated emergency management frame designed for emergency notifications. The dedicated emergency management frame may comprise a more compact management frame with a minimal overhead and may be specifically configured for emergency notifications to minimize power consumption for transmission of the emergency notification frame. The dedicated emergency management frame may comprise a minimum header and a user info field that includes one or more subfields for transmitting user information. The user information may include at least a location subfield for the geolocation of the originator STA 1022. In some embodiments, the originator STA 1022 may not comprise a GPS or be in communication with a GPS or may not have connectivity to a satellite to receive GPS information. In such embodiments, the originator STA 1022 may include the last location recorded from the GPS system or calculated based on cell tower information in a location subfield of the user info field. In some embodiments, the dedicated emergency management frame may comprise a frame control field with a type field and a subtype field. The type field may comprise a value indicative of a management frame or an extension frame and the subtype field may comprise an value indicative of the dedicated emergency notification frame. The values in the type and subtype fields may trigger invocation of an emergency notification protocol by a recipient STA for the dedicated emergency management frame.

The beacon frame may include, for instance, type field with a value indicative of a management frame such as 00 and a subtype field with a value indicative of a beacon frame such as 1000. Note that the subtype field values may be reused for data frames, control frames, and extension frames so the value in the subtype field is indicative of the beacon frame in the context of the type field including a value indicative of a management frame. In some embodiments, the beacon frame may include an element that is a user info element. The user info element in a management frame such as the beacon frame may trigger invocation of an emergency notification protocol in a recipient STA.

The user info element may comprise information about the user 1010 such as the geolocation of the user from a global positioning system (GPS) embedded or attached or otherwise in communication with the originator STA 1022. The geolocation may be in the form of coordinates such as the latitude and the longitude of the originator STA 1022. In many embodiments, the user info element may include additional information about the user 1010 such as a cellular number, a government issued ID number, a name, a user ID such as a Apple ID or a Google ID, and/or the like. In some embodiments, the number and types of information included in the user info field may be set by local regulations, established by the manufacturer of the originator STA 1022, established in a software app installed on the originator STA 1022, established by a vendor of the originator STA 1022 such as a cellular phone vendor, and/or selected in the form of preferences by the user 1010.

After or concurrently with generation of the MAC emergency notification frames 1042, the emergency logic circuitry of the SME or an app at a higher layer than the SME may coordinate communications between the emergency logic circuitry in the MAC sublayer ME (MLME) and the emergency logic circuitry in the PHY ME (PLME) to provide instructions from the MLME to the PLME to transmit the emergency notification frames 1042, including an order of active channels and optionally including the prioritized order along with the transmission power adjustments for each channel. For instance, the emergency logic circuitry in the MAC may select the first active channel in an order and send instructions to the PHY to transmit the three or more emergency notification frames 1042 (beacon frame, probe request frame, probe response frame, and optionally dedicated emergency management frame) in series on the selected channel. The MAC may repeatedly send the instructions to the PHY for a predetermined time period such as 60 seconds, rotating through transmission of each of the emergency notification frames 1042 in series to, advantageously, improve the chances that a recipient STA will receive and process the emergency notification frames 1042. The MAC may then repeat this process for each of the active channels on one or more bands until all the emergency notification frames 1042 have transmitted on all the active channels for the predetermined time period.

After the PHY sends the all the emergency notification frames 1042 via all the active channels including the channels 1, 6, and 11 in the lower band, the emergency logic circuitry of the originator STA 1022 may cause the MLME and the PLME to repeat the process of scanning for active channels, performing optimizations such as prioritization and transmission power adjustment, and transmitting the emergency notification frames on all the active channels until the emergency notification protocol is explicitly terminated or otherwise stopped by the user, as a result of lack of power, and/or the like. In some embodiments, for instance, the user may use voice control of the originator STA 1022 to instruct the emergency logic circuitry of the originator STA 1022 to terminate transmission of the emergency notification frames 1042. In some embodiments, the emergency logic circuitry in the originator STA 1022 may include a delay between each repetition of scanning and sending the emergency notification frames 1042 on all the active channels. In other embodiments, the emergency logic circuitry of the originator STA 1022 may begin scanning all channels of all bands for active channels immediately after the PHY finishes transmitting the emergency notification frames 1042 on all the active channels for the predetermined time period of, e.g., 60 seconds for each channel.

Note that the PHY will respect the rules associated with transmission of communications including checking the channel for active communication with a clear channel assessment, implementing a backoff delay if the channel is busy, and implementing a delay of, e.g., a short interframe space (SIFS) between transmission of each of the emergency notification frames 1042, and the like.

After the originator STA 1022 transmits one or more of the emergency notification frames 1042, a recipient STA such as one or more of the users device(s) 1030 may receive one or more of the emergency notification frames 1042. Upon receipt of the PHY frame including the MAC protocol data unit (MPDU), which is the MAC emergency notification frame, the PHY may pass the MPDU to the MAC to parse and interpret the emergency notification frame. The MAC may first check the frame control field to determine the type and subtype of the frame. When the MAC determines that the value of the type field and the value of the subtype field is a frame type that the recipient STA was expecting to receive (although possibly from another source), the MAC may advantageously process the remainder of the MPDU to determine that the MPDU is an emergency notification frame and may invoke emergency logic circuitry to implement an emergency notification protocol.

The user device(s) 1020 may comprise one or more recipient STAs and are on the person(s) of or in the presence of one or more user(s) 1012. The user device(s) 1020 may comprise a cell phone 1024, a tablet 1026, and a wireless router 1028. Upon receipt of one of the three or more emergency notification frames, the emergency logic circuitry of each of the recipient STAs may perform the emergency notification protocol as a recipient STA by causing transmission an emergency notification message based on the emergency notification frame via a non-Wi-Fi communication technology if available, generating three or more emergency notification frames 1043 for transmission as emergency notification messages, scanning all channels on one or more bands based on the recipient STAs capabilities and regulations for communications to identify active channels, and repeatedly cause transmission of the three or more emergency notification frames for a predetermined time period on each active channel.

The recipient STA may determine connectivity to any alternative communication system to Wi-Fi. If an alternative communication system or technology is available, the recipient STA may cause transmission of an emergency notification message via the alternative communication system. For instance, if the recipient STA is part of a cell phone and the cell phone is connected or can connect with a cell tower, the emergency logic circuitry may cause the cell phone to forward the emergency notification message to a cell tower for distribution to one or more rescue authorities. Other possible alternative communication system or technologies may include connection to the Internet via a gateway, a simple message service (SMS), Bluetooth, any other communication technology mentioned herein or that may be within the capabilities of the recipient device or STA, and/or the like.

In many embodiments, the recipient STA may have a predetermined set of destinations for the emergency notification message such as E911 for an Internet-based rescue authority system 1052, or a predetermined destination for an SMS text. In other embodiments, the user may set up such information as part of a set up procedure for the recipient device of the STA. In some embodiments, a vendor, software developer, or manufacture may set up a process for establishing the contact information when the user sets up the recipient device of the recipient STA.

The emergency logic circuitry of the recipient STA may generate the three or more emergency notification frames 1043, which may comprise a beacon frame, a probe request frame, a probe response frame, and possibly a dedicated emergency notification frame. Each of the emergency notification frames 1043 may comprise a receiver address or an address 1 that includes a broadcast address to indicate that the emergency notification frames are broadcast to all recipients. Each of the emergency notification frames 1043 may also comprise a user info field or user info element and the user info field or user info element may comprise a location subfield having the location of the originator STA received in the emergency notification frame 1042.

After, before, or concurrently with generating the MAC emergency notification frames 1043, the emergency logic circuitry of the recipient STA may scan all channels on one or more bands to identify active channels and may, in some embodiments, determine a signal strength associated with each of the active channels. The emergency logic circuitry of the recipient STA may also include channels 1, 6, and 11 of the lowest band within its capabilities such as 2.4 GHz.

After identifying the active channels, the recipient STA may optionally apply one or more optimizations such as prioritization of active channels and transmission power optimization such as discussed above, to the emergency notification frames 1043. For instance, the emergency logic circuitry of the recipient STA may order the channels based on a signal strength and may apply one or more transmission power optimizations such as applying a maximum or adjusted transmission power based on the signal strength, applying a robust rate of one megabit per second with DSSS PHY and CCK modulation (DSSS/CCK), applying data symbol repetition, applying header symbol repetition, applying preamble symbol repetition, and applying maximum guard intervals to data guard intervals and/or other guard intervals, and/or the like.

The emergency logic circuitry of the recipient STA may coordinate instructions between the MLME and the PLME to apply the one or more optimizations while transmitting each of the three or more emergency notification frames 1043 to broadcast the three or more emergency notification frames 1043 via each active channel. The emergency logic circuitry of the recipient STA may broadcast the three or more emergency notification frames 1043 by including a broadcast address in an address field of the emergency notification frames 1043. In some embodiments, the dedicated emergency management (notification) frame does not include a receiver address within which to include a broadcast address but in other embodiments, the dedicated emergency management (notification) frame does include a receiver address for a broadcast address.

The emergency logic circuitry of the recipient STA may cause the three or more emergency notification frames 1043 to transmit in series and repeat the broadcast transmission of the emergency notification frames 1043 in series, rotating through each of the different emergency frames 1043 for a predetermined time period on each active channel, such as a time period of 60 seconds.

After transmitting the three or more emergency notification messages 1043, the emergency logic circuitry of the recipient STA may repeat the emergency notification protocol by causing transmission an emergency notification message based on the emergency notification frame via a non-Wi-Fi communication technology if available, scanning all channels on all bands within the capabilities of the recipient STA to determine active channels, optionally applying one or more optimizations, and transmitting the three or more emergency notification frames for a predetermined time period on each active channel including channels 1, 6, and 11 on the lowest band. In some embodiments, the emergency logic circuitry of the recipient STA may only repeat the transmission of the emergency notification message(s) on alternative communication systems and repeat the transmission of the three or more emergency notification frames if the recipient STA receives another emergency notification frame 1042 from the originator STA or from either the originator STA or another recipient STA. In other embodiments, the emergency logic circuitry of the recipient STA may continue to repeatedly transmit the emergency notification message(s) on alternative communication systems and repeat the transmission of the three or more emergency notification frames until the user(s) 1012 explicitly terminate the broadcast transmissions or after a predetermined number of repetitions of the transmissions.

After, before, or concurrently with other actions performed by the emergency logic circuitry pursuant to the emergency notification protocol for the recipient STAs, the emergency logic circuitry or the recipient STA of one or more of the user device(s) 1020 may optionally cause output of a notification to one or more of the user(s) 1012. The notification may comprise an emergency message presented on a display of the recipient STA, a text message to the one or more of the user(s) 1012, an email to the user, an audio message to the user, and/or the like. In some embodiments, the emergency notification may include a standard message as text or voice and may include the location of the originator STA from the received emergency notification frame 1042. In some embodiments, the emergency logic circuitry of the recipient STA may have access to maps on the recipient STA and may present a standard or generic message (text and/or voice) along with a map that identifies the location of the originator STA based on the location included in the emergency notification message and/or may include a link to a map with the location so the one or more user(s) 1012 may advantageously choose whether or not to try to assist the user 1010.

After the recipient STAs of the user device(s) 1020 transmit the emergency notification frames 1043, the emergency notification frames 1043 may reach one or more of the user device(s) 1030 that are associated with one or more user(s) 1014. The user device(s) 1030 may not reside within transmission range of the originator STA 1022 but may advantageously be within transmission range of one or more of the user device(s) 1020.

The user device(s) 1030 may comprise one or more recipient STAs with access to the networks 1062 including access to the AP STA 1050 and the AP STA 1050 may be communicatively connected with or associated with the recuse authority 1052. In some embodiments, the user device(s) 1030 may comprise a smart phone 1030, a tablet 1032, and an AP STA 1034. The recipient STAs of the user device(s) 1030 may perform the emergency notification protocol described for the recipient STAs of the user device(s) 1020 and the AP STA 1050 may receive at least one of the emergency notification frames or emergency notification messages from the user device(s) 1030. Upon receipt of the emergency notification frame or emergency notification message, the AP STA 1050 may retransmit the emergency notification frames to the rescue authority 1052. In some embodiments, the AP STA may include the emergency logic circuitry and repeatedly perform the emergency notification protocol for recipient STAs. Alternatively, the AP STA 1050 may be part of the rescue authority system and may direct the user information the user info field or user info element to the appropriate rescue authority 1052 and/or one or more other rescue authorities.

Figure 1B:
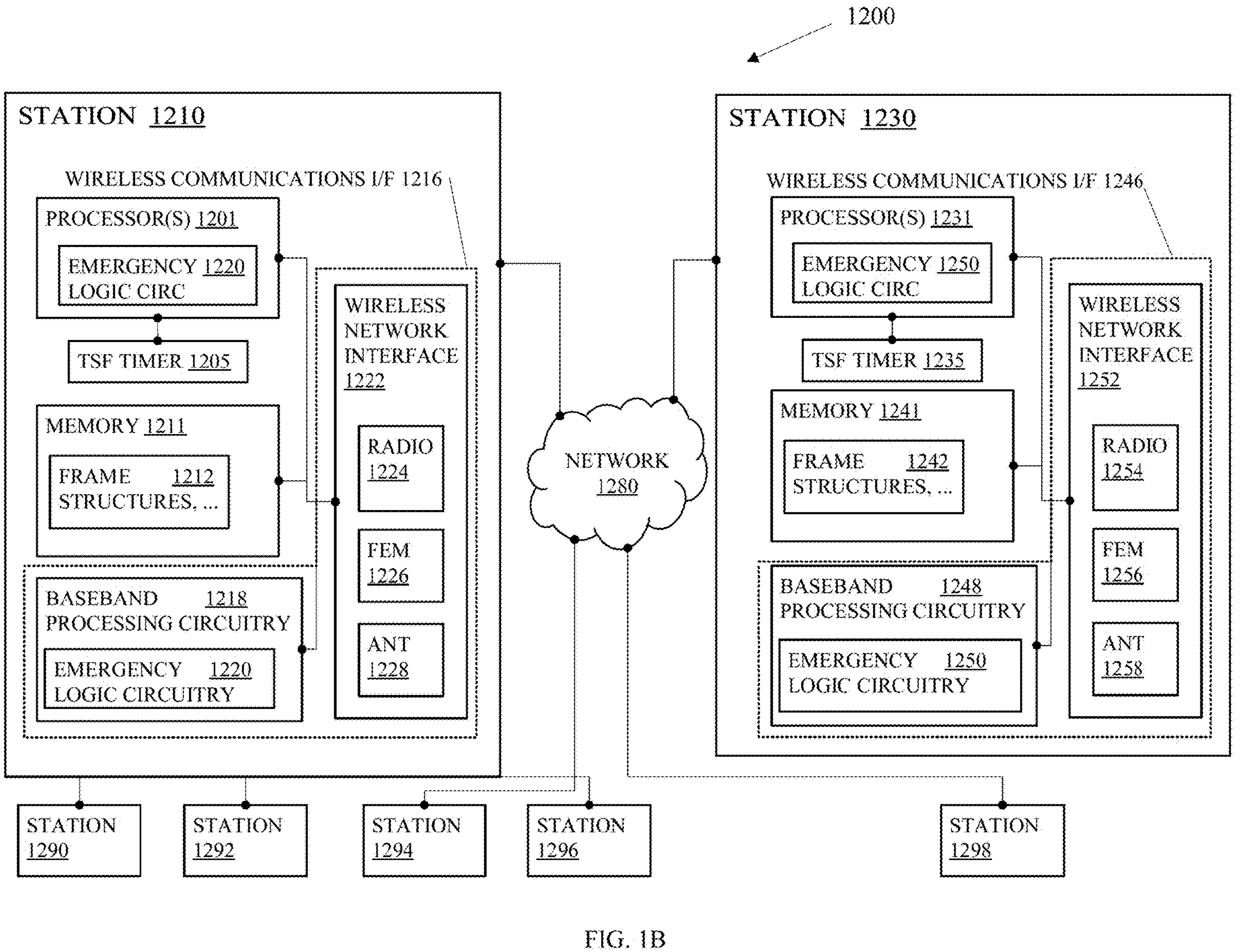
FIG. 1B depicts an embodiment of a system including multiple STAs to implement emergency logic circuitry, in accordance with one or more example embodiments.

In some embodiments, the user devices 1020, the user device(s) 1030, the AP STA 1050, and the rescue authority 1052 may include one or more computer systems similar to that of the functional diagram of FIG. 1B and/or the example machine/system of FIGS. 5, 6, 7, and 8.

One or more illustrative user device(s) 1020, the user device(s) 1030, the AP STA 1050, and the rescue authority 1052 may be operable by the user 1010, user(s) 1012, and/or the user(s) 1014 as STAs that may associate with an AP STA such as AP STA 1050 to gain access to network services. It should be noted that any addressable unit may be a STA. A STA may take on multiple distinct characteristics, each of which shape its function.

For example, a single addressable unit might simultaneously be a portable STA, a quality-of-service (QoS) STA, a dependent STA, and a hidden STA. The one or more illustrative user device(s) 1020, the user device(s) 1030, the AP STA 1050, and the rescue authority 1052 may be STAs. The one or more illustrative user device(s) 1020, the user device(s) 1030, the AP STA 1050, and the rescue authority 1052 may operate as a personal basic service set (PBSS) control point/access point (PCP/AP). The user device(s) 1020, the user device(s) 1030, the AP STA 1050, and the rescue authority 1052 may include any suitable processor-driven device including, but not limited to, a mobile device or a non-mobile, e.g., a static device. For example, user device(s) 1020, the user device(s) 1030, the AP STA 1050, and the rescue authority 1052 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless network interface, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

In some embodiments, the user device(s) 1020, the user device(s) 1030, the AP STA 1050, and the rescue authority 1052 may also include mesh stations in, for example, a mesh network, in accordance with one or more IEEE 802.11 standards and/or 3GPP standards.

Any of the user device(s) 1020, the user device(s) 1030, the AP STA 1050, and the rescue authority 1052 may be configured to communicate with each other via one or more communications networks 1062 and/or 1064 wirelessly or wired. The user device(s) 1020, the user device(s) 1030, the AP STA 1050, and the rescue authority 1052 may also communicate peer-to-peer or directly with each other with or without the AP 1050. Any of the communications networks 1062 and/or 1064 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 1062 and/or 1064 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 1062 and/or 1064 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 1020, the user device(s) 1030, the AP STA 1050, and the rescue authority 1052 may include one or more communications antennas. The one or more communications antennas may be any suitable type of antennas corresponding to the communications protocols used by the user device(s) 1020, the user device(s) 1030, the AP STA 1050, and the rescue authority 1052. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user device(s) 1020, the user device(s) 1030, the AP STA 1050, and the rescue authority 1052.

Any of the user device(s) 1020, the user device(s) 1030, the AP STA 1050, and the rescue authority 1052 may be configured to perform directional transmission and/or directional reception in conjunction with wirelessly communicating in a wireless network. Any of the user device(s) 1020, the user device(s) 1030, the AP STA 1050, and the rescue authority 1052 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 1020, the user device(s) 1030, the AP STA 1050, and the rescue authority 1052 may be configured to perform any given directional transmission towards one or more defined transmit sectors. Any of the user device(s) 1020, the user device(s) 1030, the AP STA 1050, and the rescue authority 1052 may be configured to perform any given directional reception from one or more defined receive sectors.

MIMO beamforming in a wireless network may be accomplished using RF beamforming and/or digital beamforming. In some embodiments, in performing a given MIMO transmission, the user device(s) 1020, the user device(s) 1030, the AP STA 1050, and the rescue authority 1052 may be configured to use all or a subset of its one or more communications antennas to perform MIMO beamforming.

Any of the user device(s) 1020, the user device(s) 1030, the AP STA 1050, and the rescue authority 1052 may include any suitable radio and/or transceiver for transmitting and/or receiving radio frequency (RF) signals in the bandwidth and/or channels corresponding to the communications protocols utilized by any of the user device(s) 1020, the user device(s) 1030, the AP STA 1050, and the rescue authority 1052 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n, 802.11ax, 802.11be), 5 GHz channels (e.g. 802.11n, 802.11ac, 802.11ax, 802.11be), 6 GHz (e.g., 802.11be), or 60 GHZ channels (e.g. 802.11ad, 802.11ay) or 800 MHz channels (e.g. 802.11ah). The communications antennas may operate at 28 GHz and 40 GHz. In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

FIG. 1B depicts an embodiment of a system 1200 to transmit or receive as well as to generate, transmit, receive, decode, and interpret transmissions between an AP station 1210 and multiple STAs 1230, 1290, 1292, 1294, 1296, and 1298, associated with the AP station 1210. The AP STA 1210 may be wired and wirelessly connected to each of the STAs 1230, 1290, 1292, 1294, 1296, and 1298.

In some embodiments, the STAs 1210 and 1230 may include one or more computer systems similar to that of the example machines/systems of FIGS. 5, 6, 7, and 8.

The user of the STA 1230 may have an emergency and the emergency may involve a lack of connectivity to the network 1280 due to the location of the STA 1230 and/due to a failure of Wi-Fi infrastructure in relation to the emergency for the user of the STA 1230 or another problem. The STA 1230 may, however, still have Wi-Fi capabilities.

As a result of the emergency, the user of the STA 1230 may instruct the STA 1230 to activate an emergency notification protocol via a user interface of the STA 1230 such as a touch screen, a keyboard, an audio input system, and/or the like and the emergency logic circuitry 1250 may respond via implementation of an originator STA portion of the emergency notification protocol.

The emergency logic circuitry 1250 may generate emergency notification frames comprising a beacon frame, a probe response frame, and a probe request frame. Each of the emergency notification frames may comprise a user info element comprising a user location field and the user location field may comprise a value to identify a current geolocation of the STA 1230. Each of the emergency notification frames may also comprise a receiver address field or an address 1 field that includes a broadcast address to address the emergency notification frames to all recipients of the frames.

The emergency logic circuitry 1250 may also scan multiple channels of one or more bands for communications associated with AP STAs to identify active channels; and repeatedly cause transmission of the emergency notification frames for a predetermined time period on each of the active channels.

The STA 1210 may detect one or more emergency notification frames as part of a PPDU via one of the channels and begin a process the PPDU to determine an MPDU from the transmission. In some embodiments, the PHY of the STA 1210 may receive the entire PPDU prior to passing the MPDU to the MAC of the STA 1210. In other embodiments, the PHY may pass the MPDU to the MAC as a MAC service data unit and the MAC may begin to parse the MPDU to determine the frame type and subtype to determine if the PHY should continue to receive and decode the PPDU.

Upon receipt of at least the frame control field, the MAC may determine the type and subtype of the emergency notification frame and advantageously determine to parse the remainder of the MSDU. Upon parsing the frame body of the MSDU, the MAC may determine that the frame body includes a user info element and may trigger the emergency logic circuitry 1250 of the STA 1230 to activate an emergency notification protocol as a recipient STA for processing the emergency notification frame.

As a recipient STA, the emergency logic circuitry 1220 of the STA 1210 may determine whether one or more alternative communication technologies have connectivity to send an emergency notification message. If so, the emergency logic circuitry 1220 may generate one or more emergency notification messages and transmit the one or more emergency notification messages including the location of the STA 1230 parsed from the emergency notification frame received from the STA 1230 via the one or more available alternative communication technologies.

Before, after or concurrently, the emergency logic circuitry 1220 of STA 1210 may generate three or more emergency notification frames, depending upon whether or not the protocol version of the MAC code includes a dedicated emergency notification frame. If the MAC does not include code for generation of a dedicated emergency notification frame, the emergency logic circuitry 1220 of STA 1210 may generate three emergency notification frames including a beacon frame, a probe request frame, and a probe response frame. Otherwise, if the MAC includes code for the dedicated emergency notification frame, the emergency logic circuitry 1220 of the MAC may generate the dedicated emergency notification frame for transmission as well as generate the beacon frame, the probe request frame, and the probe response frame. The emergency logic circuitry 1220 may generate each of the emergency notification frames comprising a user info element and/or a user info field that includes at least the location of the STA 1230 and may also include other user information such as a cell number, a government issued ID number, a name, a user ID, an email address, and/or the like.

After, before, or concurrently with generation of the emergency notification frames, the emergency logic circuitry 1220 may cause the STA 1210 to scan multiple channels and multiple bands to identify active channels. The STA 1210 may identify the active channels and determine RSSIs for each of the active channels.

After scanning to identify the active channels, the STA 1210, the emergency logic circuitry 1220 may prioritize active channels identified during the scanning and apply transmission range optimizations to the transmission of the emergency notification frames via the PHY. The STA 1210 may transmit each emergency notification frame in series via rotation, transmitting, e.g., the beacon frame, waiting a SIFS, transmitting the probe request frame, waiting a SIFS, and transmitting the probe response frame and waiting a SIFS before repeating the transmission of each of the frames in the same order on the active channel for a predetermined period of time such as 60 seconds. The STA 1210 may repeat the transmissions of the three emergency notification frames in series via rotation on each of the active channels for the predetermined time period until the STA 1210 transmits the emergency notification frames on all the active channels of all bands with active channels for the predetermined time period.

In some embodiments, the STA 1210 may proceed to repeat the process of scanning for active channels, prioritizing the active channels, optionally optimizing the transmissions for each of the active channels, and transmitting the emergency notification frames on each of the active channels for the predetermined time period until the emergency notification protocol is explicitly terminated, until a second predetermined time period expires, until the STA 1210 repeats the transmissions a predetermined number of times or reaches a limit for repeating the transmissions, and/or the like. In other embodiments, the emergency logic circuitry 1220 of the STA 1210 may only transmit the all the emergency notification frames on all the active channels one time.

Before, after, or concurrently with determining whether alternative communication technologies have connectivity, scanning for active channels, and generating and transmitting the emergency notification frames; the emergency logic circuitry 1220 of the STA 1210 may output a notification to a user of the STA 1210 to notify the user of the emergency situation for the user of the STA 1230.

The STA 1210 may comprise processor(s) 1201 and memory 1211. The processor(s) 1201 may comprise any data processing device such as a microprocessor, a microcontroller, a state machine, and/or the like, and may execute instructions or code in the memory 1211. The memory 1211 may comprise a storage medium such as Dynamic Random Access Memory (DRAM), read only memory (ROM), buffers, registers, cache, flash memory, hard disk drives, solid-state drives, or the like. The memory 1211 may store 1212 the frames, frame structures, frame headers, etc., and may also comprise code to generate, scramble, encode, decode, parse, and interpret MAC frames and/or physical layer (PHY) frames and PHY protocol data units (PPDUs).

The baseband processing circuitry 1218 may comprise a baseband processor and/or one or more circuits to implement a station management entity (SME). In some embodiments, the SME may interact with a MAC layer management entity to perform MAC layer functionality and a PHY management entity to perform PHY functionality. The station management entity may comprise at least part of the emergency logic circuitry such as the emergency logic circuitry 1220 of STA 1210. In such embodiments, the baseband processing circuitry 1218 may interact with processor(s) 1201 to coordinate higher layer functionality with MAC layer and PHY functionality. The processor(s) 1201 may also execute part of the emergency logic circuitry 1220 as, e.g., an application or app installed on the STA 1210.

In some embodiments, the baseband processing circuitry 1218 may interact with one or more analog devices to perform PHY functionality such as scrambling, encoding, modulating, and the like. In other embodiments, the baseband processing circuitry 1218 may execute code to perform one or more of the PHY functionality such as scrambling, encoding, modulating, and the like.

The MAC layer functionality may execute MAC layer code stored in the memory 1211 such as emergency logic circuitry code. In further embodiments, the MAC layer functionality may interface the processor(s) 1201.

The MAC layer functionality may communicate with the PHY to transmit a MAC frame such as a broadcast management frame in a PHY frame such as an DSSS/CCK PPDU to the station 1230. The MAC layer functionality may generate frames such as management, data, and control frames.

The PHY may prepare the MAC frame for transmission by, e.g., determining a PHY preamble to prepend to a MAC frame to create a PHY frame. The PHY preamble may include a sync field and a start frame delimiter (SFD) field, and the PHY header may comprise signal (SIG) field. A wireless network interface 1222 or the baseband processing circuitry 1218 may prepare the PHY frame as a scrambled, encoded, modulated PPDU in the time domain signals for the radio 1224. Furthermore, the TSF timer 1205 may provide a timestamp value in a timestamp field of the STA 1210 to indicate the time at which the PPDU is transmitted in some PPDUs.

After processing the PHY frame, a radio 1225 may impress digital data onto subcarriers of RF frequencies for transmission by electromagnetic radiation via elements of an antenna array or antennas 1224 and via the network 1280 to a receiving STA such as the STA 1230.

The wireless network I/F 1222 also comprises a receiver. The receiver receives electromagnetic energy, extracts the digital data, and the analog PHY and/or the baseband processor 1218 decodes a PHY frame and a MAC frame from a PPDU.

The STA 1230 may receive management frame in the DSSS/CCK PPDU from the STA 1210 via the network 1280. The STA 1230 may comprise processor(s) 1231 and memory 1241. The processor(s) 1231 may comprise any data processing device such as a microprocessor, a microcontroller, a state machine, and/or the like, and may execute instructions or code in the memory 1241.

The memory 1241 may comprise a storage medium such as Dynamic Random Access Memory (DRAM), read only memory (ROM), buffers, registers, cache, flash memory, hard disk drives, solid-state drives, or the like. The memory 1241 may store 1242 the frames, frame structures, frame headers, etc., and may also comprise code to generate, scramble, encode, decode, parse, and interpret MAC frames and/or PHY frames (PPDUs) such as broadcast management frames.

The baseband processing circuitry 1248 may comprise a baseband processor and/or one or more circuits to implement a station management entity (SME) and the SME may interact with a MAC layer management entity to perform MAC layer functionality and a PHY management entity to perform PHY functionality. In such embodiments, the baseband processing circuitry 1248 may interact with processor(s) 1231 to coordinate higher layer functionality with MAC layer and PHY functionality. In some embodiments, the MAC layer management entity may comprise at least part of the emergency logic circuitry 1250 of the STA 1230. The processor(s) 1231 may also comprise part of the emergency logic circuitry 1250.

In some embodiments, the baseband processing circuitry 1218 may interact with one or more analog devices to perform PHY functionality such as descrambling, decoding, demodulating, and the like. In other embodiments, the baseband processing circuitry 1218 may execute code to perform one or more of the PHY functionalities such as descrambling, decoding, demodulating, and the like.

The STA 1230 may receive the DSSS/CCK PPDU at the antennas 1258, which pass the signals along to the FEM 1256. The FEM 1256 may amplify and filter the signals and pass the signals to the radio 1254. The radio 1254 may filter the carrier signals from the signals and determine if the signals represent a PPDU. If so, analog circuitry of the wireless network I/F 1252 or physical layer functionality implemented in the baseband processing circuitry 1248 may demodulate, decode, descramble, etc. the PPDU. The baseband processing circuitry 1248 may identify, parse, and interpret the MAC management frame from the PSDU of the DSSS/CCK PPDU.

The STA 1230 further comprises an emergency logic circuitry 1250 that may, in some embodiments, operate in conjunction with the emergency logic circuitry 1220 in the baseband processing circuitry 1218 of the AP STA 1210. For instance, upon reception of the DSSS/CCK PPDU, the emergency logic circuitry 1220 may decode the frame body of the DSSS/CCK PPDU received by the non-AP STA 1230 and invoke an emergency notification protocol.

Figure 1C:
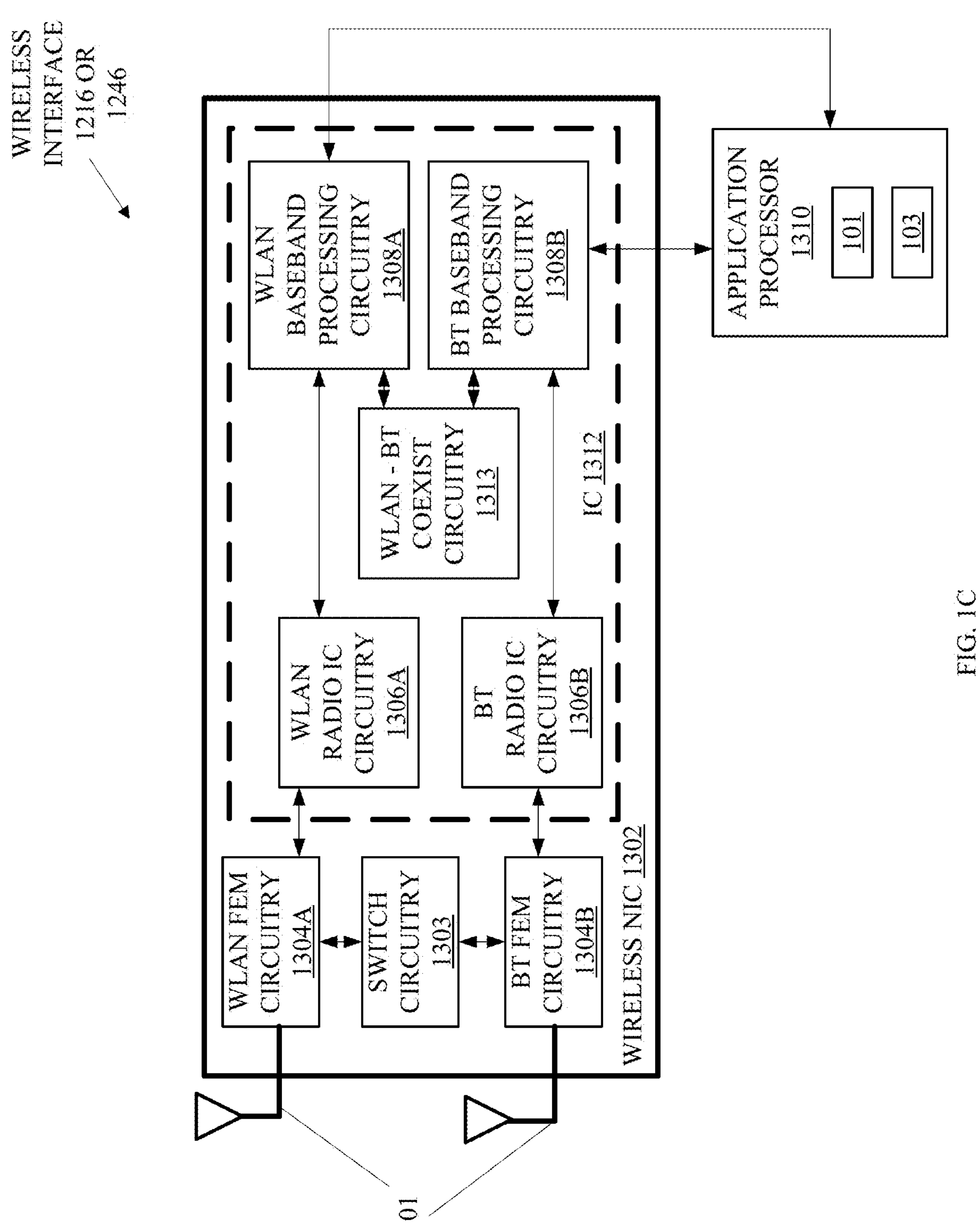
FIG. 1C illustrates an embodiment of a wireless interface for STAs, such as the STAs depicted in FIGS. 1A-C, to implement emergency logic circuitry.

FIG. 1C is a block diagram of a radio architecture such as the wireless communications I/F 1216 and 1246 in accordance with some embodiments that may be implemented in any one of the example AP 1005, mobile AP 1006, and/or the example user devices 1020 of FIG. 1A. Radio architecture 1216 and 1246 may include radio front-end module (FEM) circuitry 1304_a-b_, radio IC circuitry 1306_a-b_ and baseband processing circuitry 1308_a-b_. Radio architecture 1224 and 1254 as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 1304_a-b_ may include a WLAN or Wi-Fi FEM circuitry 1304_a_ and a Bluetooth (BT) FEM circuitry 1304_b_. The WLAN FEM circuitry 1304_a_ may include a receive signal path comprising circuitry configured to operate on WLAN RF signals received from one or more antennas 1301, to amplify the received signals and to provide the amplified versions of the received signals to the WLAN radio IC circuitry 1306_a_ for further processing. The BT FEM circuitry 1304_b_ may include a receive signal path which may include circuitry configured to operate on BT RF signals received from one or more antennas 1301, to amplify the received signals and to provide the amplified versions of the received signals to the BT radio IC circuitry 1306_b_ for further processing. FEM circuitry 1304_a_ may also include a transmit signal path which may include circuitry configured to amplify WLAN signals provided by the radio IC circuitry 1306_a_ for wireless transmission by one or more of the antennas 1301. In addition, FEM circuitry 1304_b_ may also include a transmit signal path which may include circuitry configured to amplify BT signals provided by the radio IC circuitry 1306_b_ for wireless transmission by the one or more antennas. In the embodiment of FIG. 1C, although FEM 1304_a_ and FEM 1304_b_ are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 1306*a-b* as shown may include WLAN radio IC circuitry 1306*a* and BT radio IC circuitry 1306*b*. The WLAN radio IC circuitry 1306*a* may include a receive signal path which may include circuitry to down-convert WLAN RF signals received from the FEM circuitry 1304*a* and provide baseband signals to WLAN baseband processing circuitry 1308*a*. BT radio IC circuitry 1306*b* may in turn include a receive signal path which may include circuitry to down-convert BT RF signals received from the FEM circuitry 1304*b* and provide baseband signals to BT baseband processing circuitry 1308*b*. WLAN radio IC circuitry 1306*a* may also include a transmit signal path which may include circuitry to up-convert WLAN baseband signals provided by the WLAN baseband processing circuitry 1308*a* and provide WLAN RF output signals to the FEM circuitry 1304*a* for subsequent wireless transmission by the one or more antennas 1301. BT radio IC circuitry 1306*b* may also include a transmit signal path which may include circuitry to up-convert BT baseband signals provided by the BT baseband processing circuitry 1308*b* and provide BT RF output signals to the FEM circuitry 1304*b* for subsequent wireless transmission by the one or more antennas 1301. In the embodiment of FIG. 1C, although radio IC circuitries 1306*a* and 1306*b* are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuitry 1308*a-b*, such as the baseband processing circuitry 1218 and 1248 shown in FIG. 1C, may include a WLAN baseband processing circuitry 1308*a* and a BT baseband processing circuitry 1308*b*. The WLAN baseband processing circuitry 1308*a* may include a memory, such as, for example, a set of RAM arrays in a Fast Fourier Transform or Inverse Fast Fourier Transform block (not shown) of the WLAN baseband processing circuitry 1308*a*. Each of the WLAN baseband circuitry 1308*a* and the BT baseband circuitry 1308*b* may further include one or more processors and control logic to process the signals received from the corresponding WLAN or BT receive signal path of the radio IC circuitry 1306*a-b*, and to also generate corresponding WLAN or BT baseband signals for the transmit signal path of the radio IC circuitry 1306*a-b*. Each of the baseband processing circuitries 1308*a* and 1308*b* may further include physical layer (PHY) and medium access control layer (MAC) circuitry, and may further interface with a device for generation and processing of the baseband signals and for controlling operations of the radio IC circuitry 1306*a-b*.

Referring still to FIG. 1C, according to the shown embodiment, WLAN-BT coexistence circuitry 1313 may include logic providing an interface between the WLAN baseband circuitry 1308*a* and the BT baseband circuitry 1308*b* to enable use cases requiring WLAN and BT coexistence. In addition, a switch circuitry 1303 may be provided between the WLAN FEM circuitry 1304*a* and the BT FEM circuitry 1304*b* to allow switching between the WLAN and BT radios according to application needs. In addition, although the antennas 1301 are depicted as being respectively connected to the WLAN FEM circuitry 1304*a* and the BT FEM circuitry 1304*b*, embodiments include within their scope the sharing of one or more antennas as between the WLAN and BT FEMs, or the provision of more than one antenna connected to each of FEM 1304*a* or 1304*b*.

In some embodiments, the front-end module circuitry 1304*a-b*, the radio IC circuitry 1306*a-b*, and baseband processing circuitry 1308*a-b* may be provided on a single radio card, such as wireless network interface card (NIC) 1302. In some other embodiments, the one or more antennas 1301, the FEM circuitry 1304*a-b* and the radio IC circuitry 1306*a-b* may be provided on a single radio card. In some other embodiments, the radio IC circuitry 1306*a-b* and the baseband processing circuitry 1308*a-b* may be provided on a single chip or integrated circuit (IC), such as IC 1312.

In some embodiments, the wireless NIC 1302 may include a WLAN radio card and may be configured for Wi-Fi communications, although the scope of the embodiments is not limited in this respect. In some of these embodiments, the radio architecture 1216 and 1246 may be configured to receive and transmit direct spread spectrum (DSSS) communication signals over a communication channel. The DSSS signals may comprise a plurality of subcarriers and may be modulated with, e.g., a complimentary code keying. In some of these embodiments, the radio architecture 1216 and 1246 may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 1216 and 1246 may be part of a Wi-Fi communication station (STA) such as a wireless access point (AP), a base station or a mobile device including a Wi-Fi device. In some of these embodiments, radio architecture 1216 and 1246 may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2020, 802.11ay, 802.11ba, 802.11ax, 802.11bi, and/or 802.11be standards and/or proposed specifications for WLANs, although the scope of embodiments is not limited in this respect. Radio architecture 1216 and 1246 may also be suitable to transmit and/or receive communications in accordance with other techniques and standards.

In some embodiments, the radio architecture 1216 and 1246 may be configured for DSSS or high rate DSSS (HR/DSSS) Wi-Fi communications with, e.g., CCK modulation in accordance with the IEEE 802.11ax standard. In these embodiments, the radio architecture 1216 and 1246 may be configured to communicate in accordance with an DSSS technique, although the scope of the embodiments is not limited in this respect.

In some other embodiments, the radio architecture 1216 and 1246 may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 1C, the BT baseband circuitry 1308*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 1216 and 1246 may include other radio cards, such as a cellular radio card configured for cellular (e.g., 5GPP such as LTE, LTE-Advanced or 7G communications).

In some IEEE 802.11 embodiments, the radio architecture 1216 and 1246 may be configured for communication over various channel bandwidths including bandwidths having center frequencies of about 2.4 GHz, 5 GHz, and 6 GHz. The various bandwidths may include bandwidths of about 20 MHz, 40 MHz, 80 MHz, 160 MHz, 240 MHz, and 320 MHz with contiguous or non-contiguous bandwidths having increments of 20 MHz, 40 MHz, 80 MHz, 160 MHz, 240 MHz, and 320 MHz. The scope of the embodiments is not limited with respect to the above center frequencies however.

Figures 1D, 1E:
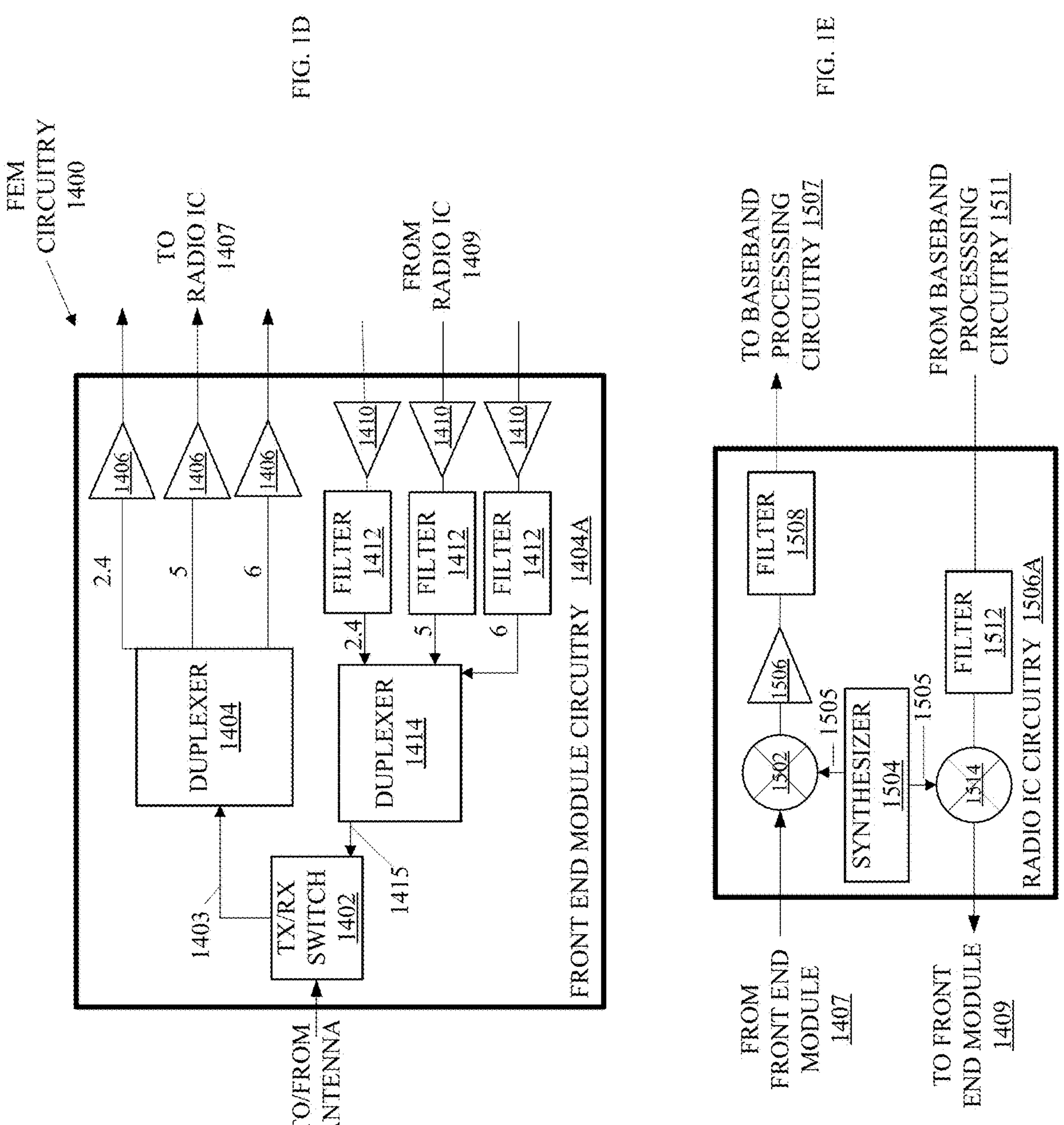
FIG. 1D illustrates an embodiment of front end module (FEM) circuitry of a wireless interface for STAs, such as the STAs in FIGS. 1A-C, to implement emergency logic circuitry.
FIG. 1E illustrates an embodiment of radio integrated circuit (IC) circuitry of a wireless interface for STAs, such as the STAs in FIGS. 1A-C, to implement emergency logic circuitry.

FIG. 1D illustrates WLAN FEM circuitry 1400 as an example of the WLAN FEM 1304*a* shown in FIG. 1C in accordance with some embodiments. Although the example of FIG. 1D is described in conjunction with the WLAN FEM circuitry 1304*a*, the example of FIG. 1D may be described in conjunction with other configurations of BT FEM circuitry.

In some embodiments, the FEM circuitry 1400 may include a TX/RX switch 1402 to switch between transmit mode and receive mode operation. The FEM circuitry 1400 may include a receive signal path and a transmit signal path. The receive signal path of the FEM circuitry 1400 may include a low-noise amplifier (LNA) 1406 to amplify received RF signals 1403 and provide the amplified received RF signals 1407 as an output (e.g., to the radio IC circuitry 1306*a-b* (FIG. 1C)). The transmit signal path of the circuitry 1400 may include a power amplifier (PA) to amplify input RF signals 1409 (e.g., provided by the radio IC circuitry 1306*a-b*), and one or more filters 1412, such as band-pass filters (BPFs), low-pass filters (LPFs) or other types of filters, to generate RF signals 1415 for subsequent transmission (e.g., by one or more of the antennas 1301 (FIG. 1C)) via an example duplexer 1414.

In some dual-mode embodiments for Wi-Fi communication, the FEM circuitry 1400 may be configured to operate in the 2.4 GHz frequency spectrum, the 5 GHz frequency spectrum, or the 6 GHz frequency spectrum. In these embodiments, the receive signal path of the FEM circuitry 1400 may include a receive signal path duplexer 1404 to separate the signals from each spectrum as well as provide a separate LNA 1406 for each spectrum as shown. In these embodiments, the transmit signal path of the FEM circuitry 1400 may also include a power amplifier 1410 and a filter 1412, such as a BPF, an LPF or another type of filter for each frequency spectrum and a transmit signal path duplexer 1404 to provide the signals of one of the different spectrums onto a single transmit path for subsequent transmission by the one or more of the antennas 1301 (FIG. 1C). In some embodiments, BT communications may utilize the 2.4 GHz signal paths and may utilize the same FEM circuitry 1400 as the one used for WLAN communications.

FIG. 1E illustrates radio IC circuitry 1506*a* as an example of radio IC circuitry 1306*a* shown in FIG. 1C in accordance with some embodiments. The radio IC circuitry 1506*a* is one example of circuitry that may be suitable for use as the WLAN or BT radio IC circuitry 1306*a*/1306*b* (FIG. 1C), although other circuitry configurations may also be suitable. Alternatively, the example of FIG. 1E may be described in conjunction with the example BT radio IC circuitry 1306*b*.

In some embodiments, the radio IC circuitry 1506*a* may include a receive signal path and a transmit signal path. The receive signal path of the radio IC circuitry 1506*a* may include at least mixer circuitry 1502, such as, for example, down-conversion mixer circuitry, amplifier circuitry 1506 and filter circuitry 1508. The transmit signal path of the radio IC circuitry 1506*a* may include at least filter circuitry 1512 and mixer circuitry 1514, such as, for example, up-conversion mixer circuitry. Radio IC circuitry 1506*a* may also include synthesizer circuitry 1504 for synthesizing a frequency 1505 for use by the mixer circuitry 1502 and the mixer circuitry 1514. The mixer circuitry 1502 and/or 1514 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 1E illustrates only a simplified version of a radio IC circuitry, and may include, although not shown, embodiments where each of the depicted circuitries may include more than one component. For instance, mixer circuitry 1514 may each include one or more mixers, and filter circuitries 1508 and/or 1512 may each include one or more filters, such as one or more BPFs and/or LPFs according to application needs. For example, when mixer circuitries are of the direct-conversion type, they may each include two or more mixers.

In some embodiments, mixer circuitry 1502 may be configured to down-convert RF signals 1407 received from the FEM circuitry 1304*a-b* (FIG. 1C) based on the synthesized frequency 1505 provided by synthesizer circuitry 1504. The amplifier circuitry 1506 may be configured to amplify the down-converted signals and the filter circuitry 1508 may include an LPF configured to remove unwanted signals from the down-converted signals to generate output baseband signals 1507. Output baseband signals 1507 may be provided to the baseband processing circuitry 1308*a-b* (FIG. 1C) for further processing. In some embodiments, the output baseband signals 1507 may be zero-frequency baseband signals, although this is not a requirement. In some embodiments, mixer circuitry 1502 may comprise passive mixers, although the scope of the embodiments is not limited in this respect.

In some embodiments, the mixer circuitry 1514 may be configured to up-convert input baseband signals 1511 based on the synthesized frequency 1505 provided by the synthesizer circuitry 1504 to generate RF output signals 1409 for the FEM circuitry 1304*a-b*. The baseband signals 1511 may be provided by the baseband processing circuitry 1308*a-b* and may be filtered by filter circuitry 1512. The filter circuitry 1512 may include an LPF or a BPF, although the scope of the embodiments is not limited in this respect.

In some embodiments, the mixer circuitry 1502 and the mixer circuitry 1514 may each include two or more mixers and may be arranged for quadrature down-conversion and/or up-conversion respectively with the help of synthesizer 1504. In some embodiments, the mixer circuitry 1502 and the mixer circuitry 1514 may each include two or more mixers each configured for image rejection (e.g., Hartley image rejection). In some embodiments, the mixer circuitry 1502 and the mixer circuitry 1514 may be arranged for direct down-conversion and/or direct up-conversion, respectively. In some embodiments, the mixer circuitry 1502 and the mixer circuitry 1514 may be configured for super-heterodyne operation, although this is not a requirement.

Mixer circuitry 1502 may comprise, according to one embodiment: quadrature passive mixers (e.g., for the in-phase (I) and quadrature phase (Q) paths). In such an embodiment, RF input signal 1407 from FIG. 1E may be down-converted to provide I and Q baseband output signals to be sent to the baseband processor.

Quadrature passive mixers may be driven by zero and ninety-degree time-varying LO switching signals provided by a quadrature circuitry which may be configured to receive a LO frequency (fLO) from a local oscillator or a synthesizer, such as LO frequency 1505 of synthesizer 1504 (FIG. 1E). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 1407 (FIG. 1D) may comprise a balanced signal, although the scope of the embodiments is not limited in this respect. The I and Q baseband output signals may be provided to low-noise amplifier, such as amplifier circuitry 1506 (FIG. 1E) or to filter circuitry 1508 (FIG. 1E).

In some embodiments, the output baseband signals 1507 and the input baseband signals 1511 may be analog baseband signals, although the scope of the embodiments is not limited in this respect. In some alternate embodiments, the output baseband signals 1507 and the input baseband signals 1511 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1504 may be a fractional-N synthesizer or a fractional N/N+1 synthesizer, although the scope of the embodiments is not limited in this respect as other types of frequency synthesizers may be suitable. For example, synthesizer circuitry 1504 may be a delta-sigma synthesizer, a frequency multiplier, or a synthesizer comprising a phase-locked loop with a frequency divider. According to some embodiments, the synthesizer circuitry 1504 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuitry 1504 may be provided by a voltage controlled oscillator (VCO), although that is not a requirement. A divider control input may further be provided by either the baseband processing circuitry 1308*a-b* (FIG. 1C) depending on the desired output frequency 1505. In some embodiments, a divider control input (e.g., N) may be determined from a look-up table (e.g., within a Wi-Fi card) based on a channel number and a channel center frequency as determined or indicated by the example application processor 1310. The application processor 1310 may include, or otherwise be connected to, one of the example secure signal converter 101 or the example received signal converter 103 (e.g., depending on which device the example radio architecture is implemented in).

In some embodiments, synthesizer circuitry 1504 may be configured to generate a carrier frequency as the output frequency 1505, while in other embodiments, the output frequency 1505 may be a fraction of the carrier frequency (e.g., one-half the carrier frequency, one-third the carrier frequency). In some embodiments, the output frequency 1505 may be a LO frequency (fLO).

Figure 1F:
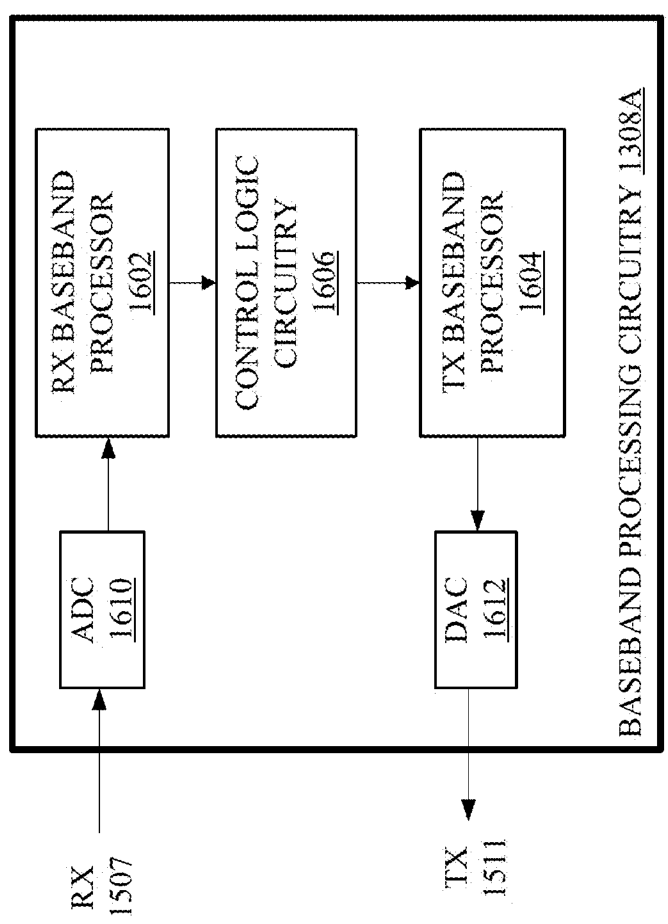
FIG. 1F illustrates an embodiment of baseband processing circuitry of a wireless interface for STAs, such as the STAs in FIGS. 1A-C, to implement emergency logic circuitry.

FIG. 1F illustrates a functional block diagram of baseband processing circuitry 1308*a* in accordance with some embodiments. The baseband processing circuitry 1308*a* is one example of circuitry that may be suitable for use as the baseband processing circuitry 1308*a* (FIG. 1C), although other circuitry configurations may also be suitable. Alternatively, the example of FIG. 1E may be used to implement the example BT baseband processing circuitry 1308*b* of FIG. 1C.

The baseband processing circuitry 1308*a* may include a receive baseband processor (RX BBP) 1602 for processing receive baseband signals 1509 provided by the radio IC circuitry 1306*a-b* (FIG. 1C) and a transmit baseband processor (TX BBP) 1604 for generating transmit baseband signals 1511 for the radio IC circuitry 1306*a-b*. The baseband processing circuitry 1308*a* may also include control logic 1606 for coordinating the operations of the baseband processing circuitry 1308*a*.

In some embodiments (e.g., when analog baseband signals are exchanged between the baseband processing circuitry 1308*a-b* and the radio IC circuitry 1306*a-b*), the baseband processing circuitry 1308*a* may include ADC 1610 to convert analog baseband signals 1609 received from the radio IC circuitry 1306*a-b* to digital baseband signals for processing by the RX BBP 1602. In these embodiments, the baseband processing circuitry 1308*a* may also include DAC 1612 to convert digital baseband signals from the TX BBP 1604 to analog baseband signals 1611.

In some embodiments that communicate OFDM signals or OFDMA signals, such as through baseband processor 1308*a*, the transmit baseband processor 1604 may be configured to generate OFDM or OFDMA signals as appropriate for transmission by performing an inverse fast Fourier transform (IFFT). The receive baseband processor 1602 may be configured to process received OFDM signals or OFDMA signals by performing an FFT. In some embodiments, the receive baseband processor 1602 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 1C, in some embodiments, the antennas 1301 (FIG. 1C) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 1301 may each include a set of phased-array antennas, although embodiments are not so limited.

Although the radio architecture 1216 and 1246 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), direct spread spectrum (DSSS), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

Figures 2A, 2B:
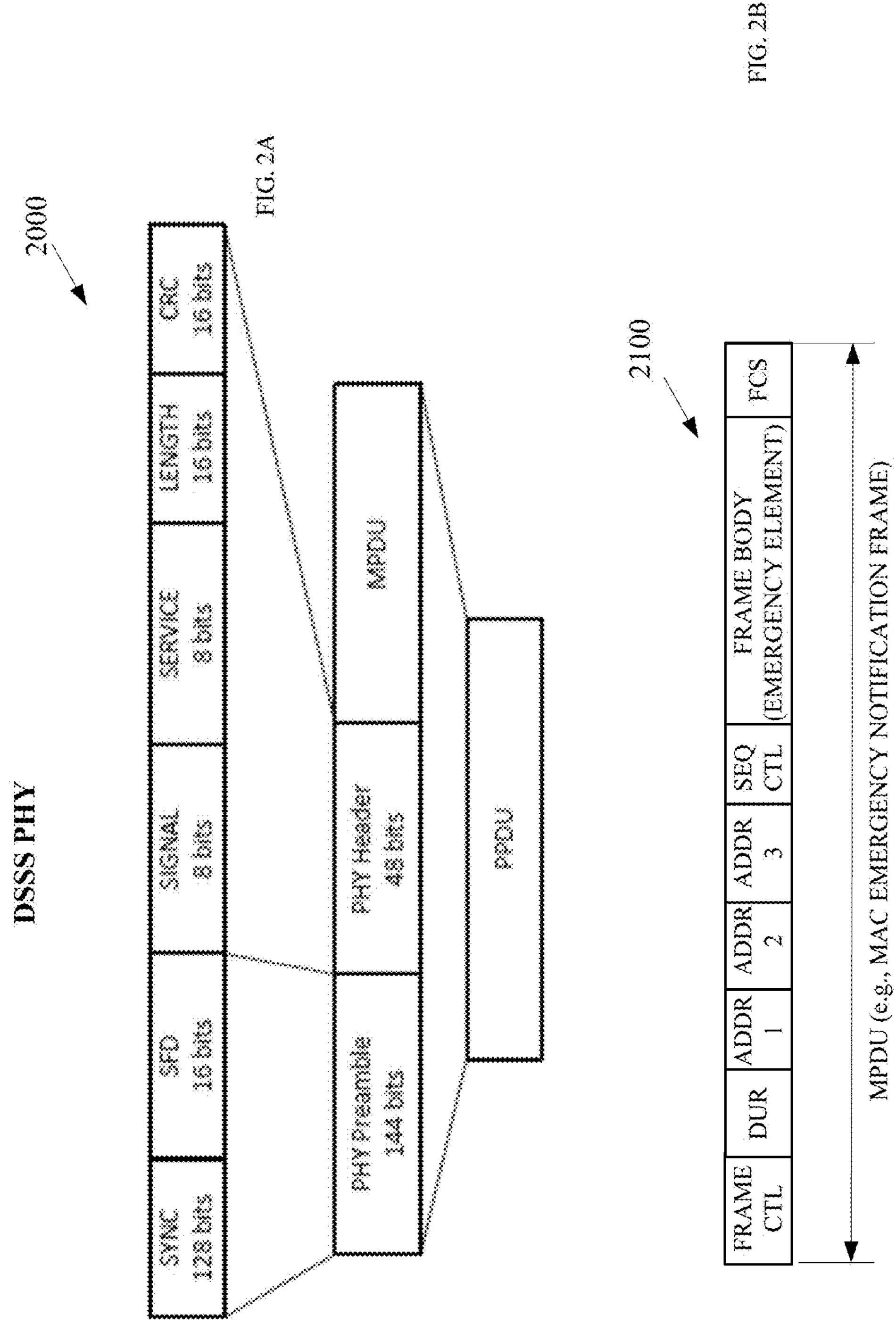
FIG. 2A depicts an embodiment of a physical layer frame to implement emergency logic circuitry.
FIG. 2B depicts an embodiment of a management frame to implement emergency logic circuitry.

FIG. 2A illustrates an example of a DSSS/CCK PPDU 2000 that may comprise a management frame in the MAC protocol data unit (MPDU) or data field of the PPDU 2000 that is an emergency notification frame 2100 in FIG. 2B. The DSSS/CCK PPDU 2000 format may be used for a transmission of each of the emergency notification frames such as a beacon frame, a probe request frame, and a probe response frame. The DSSS/CCK PPDU 2000 format may comprise a user info element 2300 shown in FIG. 2D.

The DSSS/CCK PPDU 2000 format may comprise an DSSS PHY preamble, an DSSS PHY header, and a MPDU. The PHY preamble may contain the following fields: sync field and a start frame delimiter field. The SYNC field shall consist of scrambled 1s. This field shall be provided so that the receiver can perform the necessary operations for synchronization.

The SFD shall be provided to indicate the start of PHY-dependent parameters within the PHY preamble. The SFD shall be X'F3A0' (most significant bit to least significant bit). The least significant bit (LSB) shall be transmitted first in time and the most significant bit (MSB) shall be transmitted last.

The PHY header may contain the following fields: signal field, service field, length field, and cyclic redundancy check (CRC) field. The SIGNAL field indicates to the PHY the modulation that shall be used for transmission (and reception) of the MPDU. The data rate shall be equal to the signal field value multiplied by 100 kb/s. The DSSS PHY currently supports two mandatory modulation services given by the following 8-bit words, where the LSB shall be transmitted first in time:

a) X'0A' (MSB to LSB) for 1 Mb/s DBPSK b) X'14' (MSB to LSB) for 2 Mb/s DQPSK

In some embodiments, the DSSS PHY may also implement other modulations such as CCK. The DSSS PHY includes a rate change capability. The PHY signal field shall be protected by the CRC-16 frame check sequence (FCS).

The SERVICE field is reserved for future use; it shall be set to 0 on transmission and ignored on reception. The LSB shall be transmitted first in time. The SERVICE field shall be protected by the CRC-16 FCS.

The PHY LENGTH field shall be an unsigned integer that indicates the number of microseconds required to transmit the MPDU. The transmitted value shall be determined from the LENGTH parameter. The LENGTH field is in octets and is converted to microseconds for inclusion in the PHY LENGTH field. The LSB shall be transmitted first in time. The LENGTH field shall be protected by the CRC-16 FCS.

The SIGNAL, SERVICE, and LENGTH fields shall be protected with a CRC-16 FCS. The CRC-16 FCS shall be the is complement of the remainder generated by the modulo 2 division of the protected PHY fields. The protected bits shall be processed in transmit order. All FCS calculations shall be made prior to data scrambling.

The PHY preamble and the PHY header prepends the MAC protocol data unit (MPDU) field to form a PPDU.

The MPDU field or payload of the DSSS/CCK PPDU 2000 may comprise an MPDU such as a MAC management frame 2100 in FIG. 2B and the dedicated emergency notification frame 2500 depicted in FIG. 2F. The MAC management frame 2100 may include a 2 octet frame control field, a 2 octet duration field, three address fields, a sequence control field, and a 4 octet frame check sequence field comprising a value, such as a 32-bit cyclic redundancy code (CRC), to check the validity of and/or correct preceding frame. In some embodiments, the MAC management frame 2100 may be generated in response to receipt an instruction to enter an emergency notification protocol by a user or in response to receipt of an emergency notification frame from an originator STA.

FIG. 2C depicts an embodiment of a frame control field 2200 such the frame control field in the MAC management frame 2100 shown in FIG. 2B. The frame control field 2200 may comprise a protocol version field, a type field, a subtype field, and other fields. The Protocol Version subfield is invariant in size and placement across all revisions of this standard. For the IEEE 802.11-2020 standard, the value of the protocol version is 0 for MAC frame or 1 for PV1 MAC frames. The revision level is incremented only when a fundamental incompatibility exists between a new revision and the prior edition of the standard.

The Type and Subtype subfields together identify the function of the frame. There are three frame types: control, data, and management. Each of the frame types has several defined subtypes. In Data frames, the most significant bit (MSB) of the Subtype subfield, B7, is defined as the QoS subfield. Extension frames may be one of the three frame types.

FIG. 2D depicts an embodiment of a user info element 2300. The user info element 2300 may comprise an element ID that identifies the type of element as a user info element, a length field that includes a value that indicates the number of octets in the element excluding the Element ID and Length fields, an element ID extension field, and a user info field. The element ID extension field is an optional field that may be included if the element may include an extension. The Length field indicates the number of octets in the element excluding the Element ID and Length fields.

The user Info field carries information specific to the originator STA such as the user info field 2400 shown in FIG. 2E.

FIG. 2E depicts an embodiment of a user info field 2400. The user info field 2400 may include a variety of different fields that may be defined by a manufacturer, a vendor, a software developer, or the user. In some embodiments, the user may include any desirable values in any of the fields. In some embodiments, some of the fields are set and may not be modified by the user such as a location field and a cellular number field.

In the present embodiment, the user info field comprises the location field, the cellular number field, a government issued ID field, a name field, and a user ID field. The location field may comprise a set of coordinates for the user based on coordinates received from a GPS, coordinates calculated by a cellular system, and/or the like. In some embodiments, if the GPS coordinates are unavailable and the coordinates calculated be a cellular system are unavailable, the location may include the last known coordinates for the location of the originator STA.

The cellular number may include a cell number associated with the originator STA or that is provided by the user. The government issued ID number may include an ID number of a passport, a driver's license number, a state or regional ID number, and/or the like. The name may include the name associated with an account connected with the originator STA, a name provided by the user, or the like.

The user ID may include a user ID such as a Google user ID, an Apple user ID, and/or the like. The user ID may be a user ID connected to an account associated with the originator STA and supplied by a vendor or may be a user ID provided by a user of the originator STA.

FIG. 2J depicts an embodiment of dedicated emergency notification frame 2500 (or dedicated emergency management frame) format. The dedicated emergency notification frame 2500 format may be a frame format dedicated for use as an emergency notification message for transmission via Wi-Fi that is advantageously a short frame format to reduce power expenditure when transmitting the frame as an emergency notification message. The dedicated emergency notification frame 2500 may include a frame control field with a protocol version subfield, a type subfield, a subtype subfield, and optionally other fields. The type field may comprise a value for a management frame such as 00 or an extension frame 11 and the subtype may include a value indicate of a management frame that is the dedicated emergency notification frame 2500.

The dedicated emergency notification frame 2500 may also comprise a duration field, an ADDR 1 field, a user info field such as the user info field 2400 shown in FIG. 2E, and an FCS field. The duration field may include a value of 0 for a group addressed or broadcast frame with no response frame expected. The address 1 frame may include a value of a broadcast address. The FCS field may include a frame check sequence for the dedicated emergency notification frame 2500.

FIG. 3A illustrates a flow diagram of illustrative process 3000 for initiating an emergency notification protocol. At element 3010, an originator STA (e.g., the user device 1022 of FIG. 1A and the STA 1230 of FIG. 1B) may receive an indication from a user or determined by the originator STA that the user in an emergency situation. For instance, the user may select an app on the origination STA to start an emergency notification protocol or use a voice command to initiate the emergency notification protocol. In some embodiments, the originator STA may include code to recognize that the user has been in an accident or has fallen and may determine that the user is in need of assistance. In some embodiments, the originator STA may attempt to verify that the user is in need of assistance and in other embodiments, the originator STA may, depending on the circumstances that led to the conclusion that the user is in need of assistance, make the determination and invoke the emergency notification protocol.

After invoking the emergency notification protocol, emergency logic circuitry of the originator STA may optionally check for connectivity via all communication technologies other than Wi-Fi (element 3015). The emergency logic circuitry may determine whether the originator STA may have connectivity via a cellular data service, via cell phone service, or the like. If the originator STA has service via one or more technologies, the originator STA may send emergency notification messages via each of the communication technologies and may include user information such as the user information described in the user info field 2400 in FIG. 2E.

After checking for connectivity, the emergency logic circuitry of the originator STA may generate emergency notification frames (element 3020) such as a beacon frame, a probe request frame, and a probe response frame. Each of the frames may include a user info element. The user info element may include user information such as the user information described in the user info field 2400 in FIG. 2E such as the location of the originator STA, a phone number for the user or the originator STA, a name of the user, and possibly other information.

After, before, or concurrently with generation of the emergency notification frames, the emergency logic circuitry of the originator STA may scan all channels of one or more bands to determine which channels have activity and identify the channels with activity as active channels (element 3025). In some embodiments, the emergency logic circuitry may also include channels 1, 6, and 11 on the low band available for Wi-Fi communications by the originator STA.

After scanning to identify the active channels, the emergency logic circuitry of the originator STA may cause transmission of the emergency notification frames on each of the active channels (element 3030). The emergency logic circuitry may cause transmission of the emergency notification frames in an order repeatedly on each active channel for a predetermined time period and may then restart the emergency notification protocol. After restarting the emergency notification protocol, the emergency logic circuitry may scan all channels of all bands for active channels, include the channels 1, 6, and 11 in the active channels list, and repeatedly transmit the emergency frames on each active channel for the predetermined time period. In many embodiments, the emergency logic circuitry may repeatedly restart the emergency protocol until the user explicitly terminates the protocol.

Referring to FIG. 3B, the flowchart 3100 may perform optimizations of transmission of the emergency notification frames. The flowchart 3100 may order active channels detected during the scans (element 3110). The emergency logic circuitry of the originator STA may determine a signal strength of the activity on the active channels for application of optimizations such as ordering the active channels from the channels that have the highest signal strength to the channels with the lowest signal strength. The channels with the highest signal strength may more likely be representative of channels that have communications from other STAs that are closer to the originator STA so emergency notification frames may be transmitted on these active channels first.

The emergency logic circuitry of the originator STA may also determine to adjust the transmission power on some or all the active channels based on the signal strength detected on the active channels (3115). For instance, the emergency notification logic of the originator STA may set a default transmission power for the maximum allowable transmission power but may optimize the use of the power if the originator STA is operating with battery power. For instance, if the signal strength of an active channel is at or above a first threshold, the emergency logic circuitry may set the transmission power to a low power setting. If the signal strength of an active channel is below the first threshold and at or above a second threshold, the emergency logic circuitry may set the transmission power to a medium power setting. If the signal strength of an active channel is below the second threshold and at or above a third threshold, the emergency logic circuitry may set the transmission power to a high power setting. If the signal strength of an active channel is below the third threshold, the emergency logic circuitry may set the transmission power for the active channel at the maximum transmission power. In other embodiments, the emergency logic circuitry may only check for the signal strength being at or above a first threshold and set the transmission power to a first transmission power setting if the signal strength is at or above the first threshold or a maximum power setting if the signal strength is below the first threshold. In still other embodiments, the have two thresholds and three different power settings such as low, high, and maximum.

At FIG. 4A, there is shown a flowchart 4000 to illustrate an emergency notification protocol for a recipient STA (e.g., the user device(s) 1020 and 1030 of FIG. 1A and the STA 1210 of FIG. 1C). At element 4000, the first AP STA may receive an emergency notification frame that is a management frame and includes a user info element. The inclusion of the user info element in the management frame may identify the management frame as an emergency notification frame and may invoke the emergency notification protocol by emergency logic circuitry of the recipient STA.

After the emergency notification protocol is invoked, the emergency logic circuitry of the recipient STA may propagate emergency notification messages through any available communication channels other than Wi-Fi (element 4015). For instance, if the recipient STA has SMS, cellular connectivity or Internet access, the emergency logic circuitry of the recipient STA may cause the recipient STA to send one or more emergency notification messages including the user information in the user info element of the emergency notification frame received from an originator STA or another recipient STA. The recipient STA may have access to one or more addresses in memory for SMS text messages, cellular data messages, or Internet addresses such as email addresses to one or more rescue authorities such as a police department, and E911 service stations, a fire department, an ambulance service, and/or the like.

After propagating emergency notification messages through alternative communication channels, the emergency logic circuitry of the recipient STA may scan all channels on all bands to identify active channels (element 4020). The emergency logic circuitry may perform active and/or passive scans on all channels of all bands within the capabilities of the recipient STA to locate channels with Wi-Fi communications. Upon detection of activity on a channel, the emergency logic circuitry may assess the signal strength of a communication of the channel and possibly perform one or more optimizations based on the signal strength. In some embodiments, the recipient STA may order the active channels based on the signal strength of each channel and adjust the transmission power of transmission of emergency notification messages on one or more of the active channels based on the signal strength detected on each of the one or more active channels.

Concurrently with scanning, the recipient STA may generate a set of three or four emergency notification messages (element 4025). For instance, the emergency logic circuitry of the recipient STA may generate a beacon frame, a probe request frame, and a probe response frame and include the user info element from the received emergency notification frame in the generated emergency notification frames. The recipient STA may also generate a dedicated emergency notification frame that is a compact management frame that includes the user information from the received emergency notification frame.

After generating the set of three or four emergency notification frames, the emergency logic circuitry of the recipient STA may retransmit the user information from the received emergency notification frame in the generated emergency notification frames on each of the active channels, optionally in an order based on the signal strengths and optionally at an adjusted transmission power based on the signal strengths of each of the active channels (element 4030). In some embodiments, the emergency logic circuitry of the recipient STA may repeatedly transmit the emergency notification frames on each of the active channels for a predetermined time period.

In some embodiments, the emergency logic circuitry may repeat the elements 4015, 4020, 4025, and 4030 one or more times or until the process is explicitly stopped by a user of the recipient STA. In some embodiments, the emergency logic circuitry may not repeat generation of the emergency notification frames because the recipient STA may store the frames in memory for repeated use.

Concurrently with other elements of the flowchart 4000, the emergency logic circuitry of the recipient STA may notify the user of the recipient STA of the received emergency notification frame including the user information to prompt the user to assist the user of the originator STA if possible. For instance, the user of the recipient STA may have access to a phone line or other communications technology that can be used to contact rescue authorities.

At FIG. 4B, there is shown a flowchart 4100 to illustrate a concatenation of multiple emergency notification frames received by a recipient STA (e.g., the user device(s) 1020 and 1030 of FIG. 1A and the STA 1210 of FIG. 1C) from an originator STA (e.g., user device 1022 in FIG. 1A and STA 1230 in FIG. 1C). For instance, the recipient device may receive emergency notification messages from multiple originator STAs and possibly through more than one communication technologies. Rather than separately retransmitting each of the received frames, the emergency logic circuitry of the recipient STA may generate a set of emergency notification frames and include the user info elements from each of the received frames in the frame body of each of the emergency notification frames (element 4110). For instance, the recipient STA may receive three different emergency notification messages from three different originator STAs and may, when generating the emergency notification messages, include each of the three user info elements in each of the emergency notification frames.

After generation of the emergency notification frames, the emergency notification logic may cause transmission of the emergency notification fames on each of the active channels for a minimum of the predetermined time period such as 60 seconds (element 4115).

Figure 5:
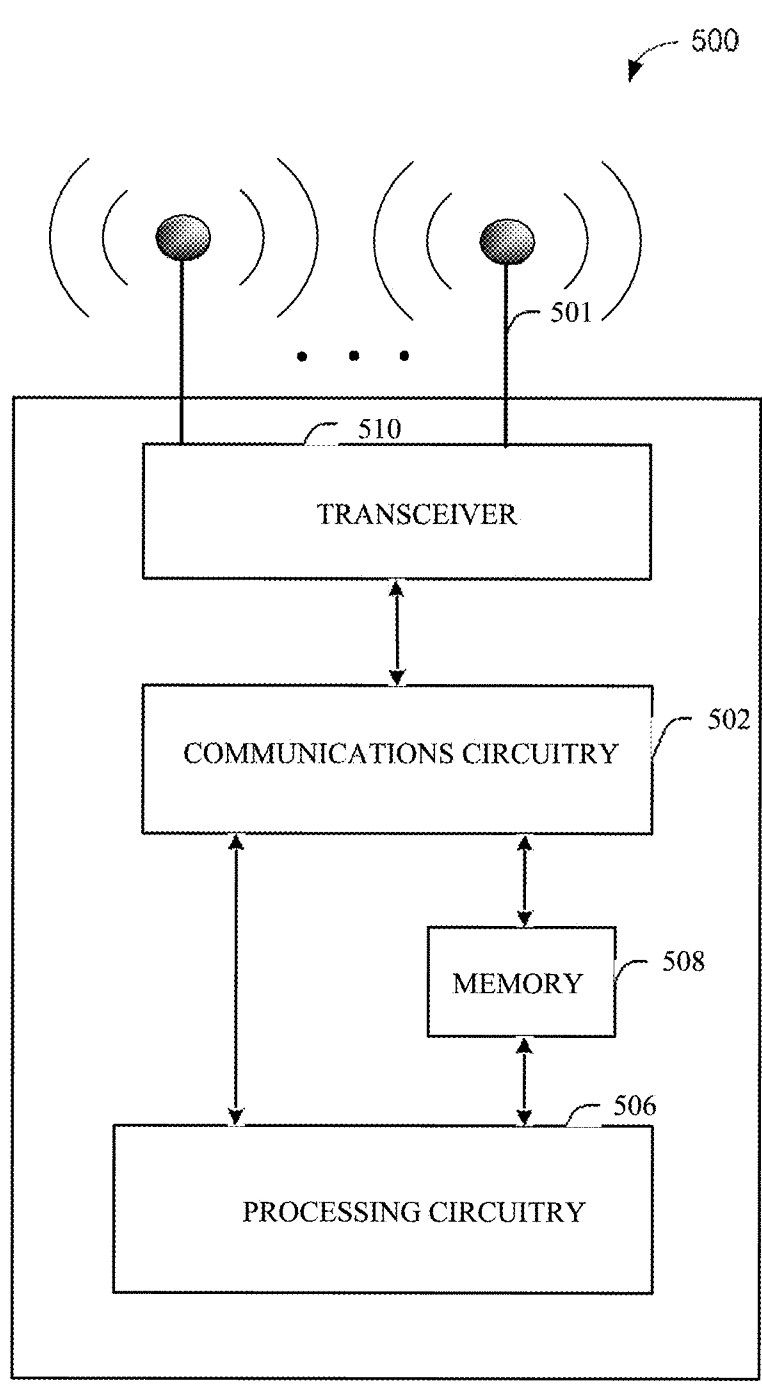
FIG. 5 depicts an embodiment of a functional diagram of a wireless communication device, in accordance with one or more example embodiments of the present disclosure.

FIG. 5 shows a functional diagram of an exemplary communication station 500, in accordance with one or more example embodiments of the present disclosure. In one embodiment, FIG. 5 illustrates a functional block diagram of a communication station that may be suitable for use as a mobile AP 1050 (FIG. 1A) or a user device 1028 (FIG. 1A) in accordance with some embodiments. The communication station 500 may also be suitable for use as other user device(s) 1020 such as the user devices 1024 and/or 1026. The user devices 1024 and/or 1026 may include, e.g., a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 500 may include communications circuitry 502 and a transceiver 510 for transmitting and receiving signals to and from other communication stations using one or more antennas 501. The communications circuitry 502 may include circuitry that can operate the physical layer (PHY) communications and/or medium access control (MAC) communications for controlling access to the wireless medium, and/or any other communications layers for transmitting and receiving signals. The communication station 500 may also include processing circuitry 506 and memory 508 arranged to perform the operations described herein. In some embodiments, the communications circuitry 502 and the processing circuitry 506 may be configured to perform operations detailed in the above figures, diagrams, and flows.

In accordance with some embodiments, the communications circuitry 502 may be arranged to contend for a wireless medium and configure frames or packets for communicating over the wireless medium. The communications circuitry 502 may be arranged to transmit and receive signals. The communications circuitry 502 may also include circuitry for modulation/demodulation, upconversion/downconversion, filtering, amplification, etc. In some embodiments, the processing circuitry 506 of the communication station 500 may include one or more processors. In other embodiments, two or more antennas 501 may be coupled to the communications circuitry 502 arranged for sending and receiving signals. The memory 508 may store information for configuring the processing circuitry 506 to perform operations for configuring and transmitting message frames and performing the various operations described herein. The memory 508 may include any type of memory, including non-transitory memory, for storing information in a form readable by a machine (e.g., a computer). For example, the memory 508 may include a computer-readable storage device, read-only memory (ROM), random-access memory (RAM), magnetic disk storage media, optical storage media, flash-memory devices and other storage devices and media.

In some embodiments, the communication station 500 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 500 may include one or more antennas 501. The antennas 501 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 500 may include one or more of a keyboard, a display, a non-volatile memory port, multiple antennas, a graphics processor, an application processor, speakers, and other mobile device elements. The display may be an LCD screen including a touch screen.

Although the communication station 500 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 500 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 500 may include one or more processors and may be configured with instructions stored on a computer-readable storage device.

Figure 6:
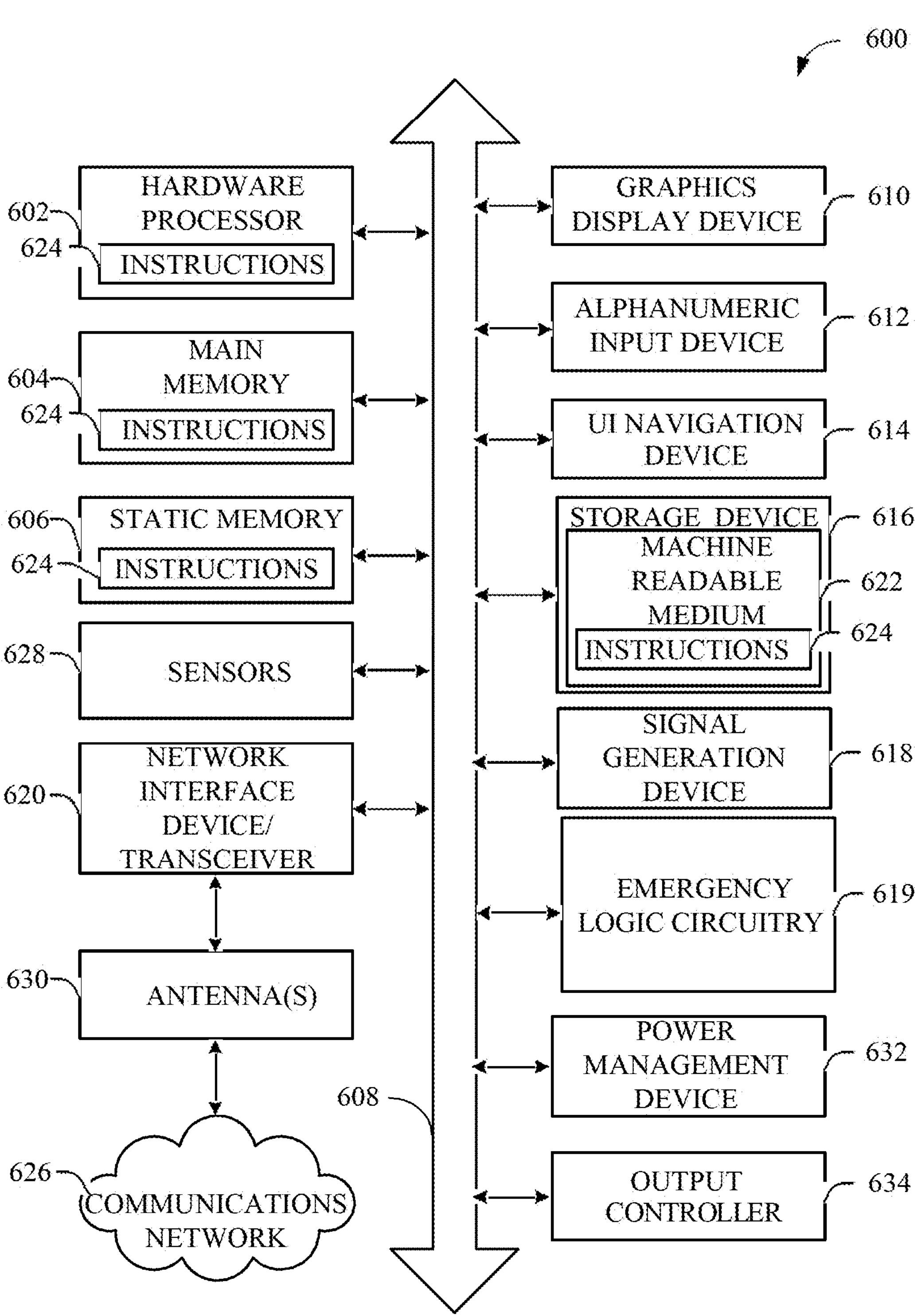
FIG. 6 depicts an embodiment of a block diagram of a machine upon which any of one or more techniques may be performed, in accordance with one or more embodiments.

FIG. 6 illustrates a block diagram of an example of a machine 600 or system upon which any one or more of the techniques (e.g., methodologies) discussed herein may be performed. For instance, the machine may comprise an AP STA such as the mobile AP 1050 and/or one of the user devices 1020 and/or user device 1022 shown in FIG. 1A. In other embodiments, the machine 600 may operate as a standalone device or may be connected (e.g., networked) to other machines. In a networked deployment, the machine 600 may operate in the capacity of a server machine, a client machine, or both in server-client network environments. In an example, the machine 600 may act as a peer machine in peer-to-peer (P2P) (or other distributed) network environments. The machine 600 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the execution units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 600 may include a hardware processor 602 (e.g., a central processing unit (CPU), a graphics processing unit (GPU), a hardware processor core, or any combination thereof), a main memory 604 and a static memory 606, some or all of which may communicate with each other via one or more interlinks (e.g., buses or high speed interconnects) 608. Note that the single set of interlinks 608 may be representative of the physical interlinks in some embodiments but is not representative of the physical interlinks 608 in other embodiments. For example, the main memory 604 may couple directly with the hardware processor 602 via high speed interconnects or a main memory bus. The high speed interconnects typically connect two devices and the bus is generally designed to interconnect two or more devices and include an arbitration scheme to provide fair access to the bus by the two or more devices.

The machine 600 may further include a power management device 632, a graphics display device 610, an alphanumeric input device 612 (e.g., a keyboard), and a user interface (UI) navigation device 614 (e.g., a mouse). In an example, the graphics display device 610, alphanumeric input device 612, and UI navigation device 614 may be a touch screen display. The machine 600 may additionally include a storage device (i.e., drive unit) 616, a signal generation device 618 (e.g., a speaker), a emergency logic circuitry 619, a network interface device/transceiver 620 coupled to antenna(s) 630, and one or more sensors 628, such as a global positioning system (GPS) sensor, a compass, an accelerometer, or other sensor. The machine 600 may include an output controller 634, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)). The operations in accordance with one or more example embodiments of the present disclosure may be carried out by a baseband processor such as the baseband processing circuitry 1218 and/or 1248 shown in FIG. 1C. The baseband processor may be configured to generate corresponding baseband signals. The baseband processor may further include physical layer (PHY) and medium access control layer (MAC) circuitry, and may further interface with the hardware processor 602 for generation and processing of the baseband signals and for controlling operations of the main memory 604, the storage device 616, and/or the emergency logic circuitry 619. The baseband processor may be provided on a single radio card, a single chip, or an integrated circuit (IC).

The storage device 616 may include a machine readable medium 622 on which is stored one or more sets of data structures or instructions 624 (e.g., software) embodying or utilized by any one or more of the techniques or functions described herein. The instructions 624 may also reside, completely or at least partially, within the main memory 604, within the static memory 606, or within the hardware processor 602 during execution thereof by the machine 600. In an example, one or any combination of the hardware processor 602, the main memory 604, the static memory 606, or the storage device 616 may constitute machine-readable media.

The emergency logic circuitry 619 may carry out or perform any of the operations and processes (e.g., processes 3000, 3100, 4000, and 4100 shown in FIGS. 3A-B and 4A-B) described and shown above.

It is understood that the above are only a subset of what the emergency logic circuitry 619 may be configured to perform and that other functions included throughout this disclosure may also be performed by the emergency logic circuitry 619.

While the machine-readable medium 622 is illustrated as a single medium, the term "machine-readable medium" may include a single medium or multiple media (e.g., a centralized or distributed database, and/or associated caches and servers) configured to store the one or more instructions 624.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 600 and that cause the machine 600 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 624 may further be transmitted or received over a communications network 626 using a transmission medium via the network interface device/transceiver 620 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 620 may include one or more physical jacks (e.g., Ethernet, coaxial, or phone jacks) or one or more antennas to connect to the communications network 626. In an example, the network interface device/transceiver 620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 600 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 7:
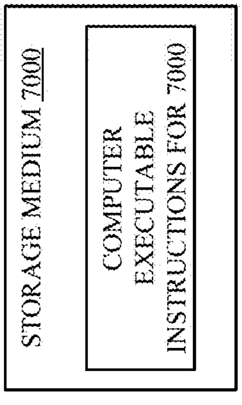
FIGS. 7-8 depict embodiments of a computer-readable storage medium and a computing platform to implement emergency logic circuitry.

FIG. 7 illustrates an example of a storage medium 7000 to store emergency logic such as logic to implement the emergency logic circuitry 619 shown in FIG. 6 and/or the other logic discussed herein for defining one or more procedures, one or more keys, cipher suites, capability bits, replay counters, frames, KDEs, subelements, and fields for encryption and decryption of group addressed management and/or action frames. Storage medium 7000 may comprise an article of manufacture. In some examples, storage medium 7000 may include any non-transitory computer readable medium or machine-readable medium, such as an optical, magnetic or semiconductor storage. Storage medium 7000 may store diverse types of computer executable instructions, such as instructions to implement logic flows and/or techniques described herein. Examples of a computer readable or machine-readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like.

Figure 8:
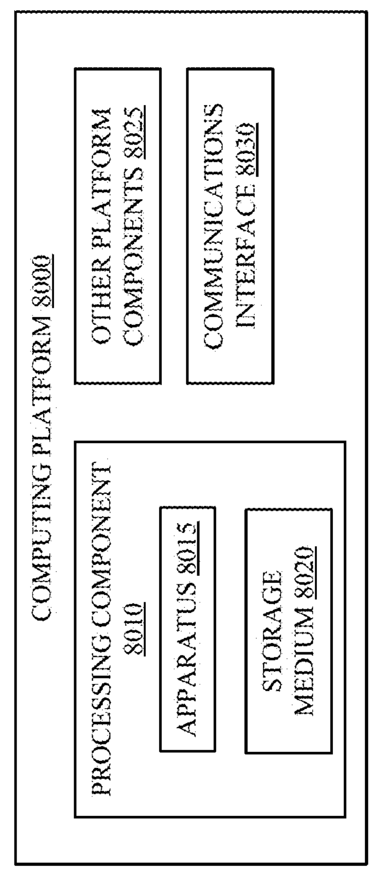

FIG. 8 illustrates an example computing platform 8000 such as the AP STA 1050, user devices 1022, 1020, and 1030; STA 1210 and STA 1230 in FIGS. 1A and 1C. In some examples, as shown in FIG. 8, computing platform 8000 may include a processing component 8010, other platform components or a communications interface 8030 such as the wireless network interfaces 1222 and 1252 shown in FIG. 1B. According to some examples, computing platform 8000 may be a computing device such as a server in a system such as a data center or server farm that supports a manager or controller for managing configurable computing resources as mentioned above.

According to some examples, processing component 8010 may execute processing operations or logic for apparatus 8015 described herein. Processing component 8010 may include various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits (ICs), application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements, which may reside in the storage medium 8020, may include software components, programs, applications, computer programs, application programs, device drivers, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. While discussions herein describe elements of embodiments as software elements and/or hardware elements, decisions to implement an embodiment using hardware elements and/or software elements may vary in accordance with any number of design considerations or factors, such as desired computational rate, power levels, heat tolerances, processing cycle budget, input data rates, output data rates, memory resources, data bus speeds and other design or performance constraints.

In some examples, other platform components 8025 may include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., universal serial bus (USB) memory), solid state drives (SSD) and any other type of storage media suitable for storing information.

In some examples, communications interface 8030 may include logic and/or features to support a communication interface. For these examples, communications interface 8030 may include one or more communication interfaces that operate according to various communication protocols or standards to communicate over direct or network communication links. Direct communications may occur via use of communication protocols or standards described in one or more industry standards (including progenies and variants) such as those associated with the Peripheral Component Interconnect (PCI) Express specification. Network communications may occur via use of communication protocols or standards such as those described in one or more Ethernet standards promulgated by the Institute of Electrical and Electronics Engineers (IEEE). For example, one such Ethernet standard may include IEEE 802.3-2012, Carrier sense Multiple access with Collision Detection (CSMA/CD) Access Method and Physical Layer Specifications, Published in December 2012 (hereinafter "IEEE 802.3"). Network communication may also occur according to one or more OpenFlow specifications such as the OpenFlow Hardware Abstraction API Specification. Network communications may also occur according to Infiniband Architecture Specification, Volume 1, Release 1.3, published in March 2015 ("the Infiniband Architecture specification").

Computing platform 8000 may be part of a computing device that may be, for example, a server, a server array or server farm, a web server, a network server, an Internet server, a work station, a mini-computer, a main frame computer, a supercomputer, a network appliance, a web appliance, a distributed computing system, multiprocessor systems, processor-based systems, or combination thereof. Accordingly, various embodiments of the computing platform 8000 may include or exclude functions and/or specific configurations of the computing platform 8000 described herein.

The components and features of computing platform 8000 may comprise any combination of discrete circuitry, ASICs, logic gates and/or single chip architectures. Further, the features of computing platform 8000 may comprise microcontrollers, programmable logic arrays and/or microprocessors or any combination of the foregoing where suitably appropriate. Note that hardware, firmware and/or software elements may be collectively or individually referred to herein as "logic".

One or more aspects of at least one example may comprise representative instructions stored on at least one machine-readable medium which represents various logic within the processor, which when read by a machine, computing device or system causes the machine, computing device or system to fabricate logic to perform the techniques described herein. Such representations, known as "IP cores" may be stored on a tangible, machine readable medium and supplied to various customers or manufacturing facilities to load into the fabrication machines that make the logic or processor.

Some examples may include an article of manufacture or at least one computer-readable medium. A computer-readable medium may include a non-transitory storage medium to store logic. In some examples, the non-transitory storage medium may include one or more types of computer-readable storage media capable of storing electronic data, including volatile memory or non-volatile memory, removable or non-removable memory, erasable or non-erasable memory, writeable or re-writeable memory, and so forth. In some examples, the logic may include various software elements, such as software components, programs, applications, computer programs, application programs, system programs, machine programs, operating system software, middleware, firmware, software modules, routines, subroutines, functions, methods, procedures, software interfaces, API, instruction sets, computing code, computer code, code segments, computer code segments, words, values, symbols, or any combination thereof.

According to some examples, a computer-readable medium may include a non-transitory storage medium to store or maintain instructions that when executed by a machine, computing device or system, cause the machine, computing device or system to perform methods and/or operations in accordance with the described examples. The instructions may include any suitable type of code, such as source code, compiled code, interpreted code, executable code, static code, dynamic code, and the like. The instructions may be implemented according to a predefined computer language, manner, or syntax, for instructing a machine, computing device or system to perform a certain function. The instructions may be implemented using any suitable high-level, low-level, object-oriented, visual, compiled and/or interpreted programming language.

Some examples may be described using the expression "coupled" and "connected" along with their derivatives. These terms are not necessarily intended as synonyms for each other. For example, descriptions using the terms "connected" and/or "coupled" may indicate that two or more elements are in direct physical or electrical contact with each other. The term "coupled," however, may also mean that two or more elements are not in direct contact with each other, but yet still co-operate or interact with each other.

Advantages of Some Embodiments

Several embodiments have one or more potentially advantages effects. For instance, use of Wi-Fi to communicate emergency notification messages, leverage of Wi-Fi when other communication technologies may be unavailable, leverage of current frames to improve likelihood of receipt of the emergency notification messages, leverage of optimizations to increase transmission range, leverage of optimizations to reduce power consumption, decrease overhead by use of current frames, and/or the like.

Examples of Further Embodiments

The following examples pertain to further embodiments. Specifics in the examples may be used anywhere in one or more embodiments.

Example 1 is a device comprising memory; and logic circuitry coupled to the memory, the logic circuitry configured to generate emergency notification frames comprising a beacon frame, a probe response frame, and a probe request frame, wherein each of the emergency notification frames comprise a user info element, the user info element comprising a user location field, the user location field comprising a value to identify a current geolocation of the device; scan multiple channels of one or more bands for communications associated with access point (AP) STAs to identify active channels; and repeatedly cause transmission of the emergency notification frames for a predetermined time period on each of the active channels. In Example 2, the device of Example 1, wherein the logic circuitry comprises baseband processing circuitry and further comprising a radio coupled with the baseband processing circuitry, and one or more antennas coupled with the radio to transmit the emergency management frame. In Example 3, the device of Example 1, wherein generation of the emergency notification frames comprises generation of a fourth emergency notification frame, the fourth emergency notification frame comprising a type field with a value indicative of management frame and a subtype field comprising a value indicative of the fourth emergency notification frame, a combination of the value of the type field and the value of the subtype field to signal to a recipient station (STA) to invoke an emergency notification protocol to cause the recipient STA to retransmit user information in the user info element in a subsequent emergency notification frame. In Example 4, the device of Example 1, wherein presence of the user info element in each of the three emergency notification frames is a signal for a recipient station (STA) to invoke an emergency notification protocol to cause the recipient STA to retransmit user information in the user info element in a subsequent emergency notification message. In Example 5, the device of Example 1, wherein a minimum time period for the predetermined time period is sixty seconds. In Example 6, the device of Example 1, wherein a minimum time period for the predetermined time period is a default time period for an unassociated client device to wait between scanning of all available channels. In Example 7, the device of Example 1, the logic circuitry to repeat a process until explicitly terminated via a user interface of the device, the process to scan multiple channels of the one or more bands to identify active channels on the one or more bands; and repeatedly cause transmission of the emergency notification frames for the predetermined time period. In Example 8, the device of Example 1, wherein the user info field further comprises a name field for a name of a user of the device, a cell number field for a cellular number for the user of the device, a government ID field for a government issued identifier (ID) for the user, a user ID field for a user ID associated with the user, or a combination thereof. In Example 9, the device of Example 1, the logic circuitry to repeatedly cause transmission of the three emergency notification frames on channels 1, 6, and 11 of a lower band for the predetermined time period regardless of whether channels 1, 6, and 11 are identified as active channels, wherein the lower band is 2.4 gigahertz (GHz). In Example 10, the device of Example 1, the logic circuitry to repeatedly cause transmission of the three emergency notification frames on the active channels in a channel order based on a priority of each channel of the active channels, wherein the priority of a respective channel is based on a signal strength detected for the respective channel. In Example 11, the device of Example 10, the logic circuitry to apply one or more transmission optimizations to transmission of the three emergency notification frames on the respective channel of the active channels based on the signal strength detected on the respective channel. In Example 12, the device of Example 11, wherein the one or more transmission optimizations comprise application of a maximum transmission power for emergency notification messages to transmission of the emergency notification frames, application of direct sequence spread spectrum (DSSS)/complimentary code keying (CCK) to transmission of the emergency notification frames, causing transmission of the emergency notification frames at a data rate of one megabits per second, causing transmission of the emergency notification frames with data repetition, causing transmission of the emergency notification frames with header repetition, causing transmission of the emergency notification frames with physical layer preamble repetition, and causing transmission of the emergency notification frames with a maximum guard interval between data symbols wherein the maximum guard interval is defined by an IEEE 802.11 standard applicable to transmission of the emergency notification frames. In Example 13, the device of Example 12, wherein the maximum guard interval between data symbols is 3.2 microseconds and the IEEE 802.11 standard applicable to transmission of the emergency notification frames is IEEE 802.11ax-2021.

Example 14 is a non-transitory computer-readable medium storing computer-executable instructions which when executed by one or more processors, result in performing operations to generate emergency notification frames comprising a beacon frame, a probe response frame, and a probe request frame, wherein each of the emergency notification frames comprise a user info element, the user info element comprising a user location field, the user location field comprising a value to identify a current geolocation of the device; scan multiple channels of one or more bands for communications associated with access point (AP) STAs to identify active channels; and repeatedly cause transmission of the emergency notification frames for a predetermined time period on each of the active channels. In Example 15, the non-transitory computer-readable medium of Example 14, wherein generation of the emergency notification frames comprises generation of a fourth emergency notification frame, the fourth emergency notification frame comprising a type field with a value indicative of management frame and a subtype field comprising a value indicative of the fourth emergency notification frame, a combination of the value of the type field and the value of the subtype field to signal to a recipient station (STA) to invoke an emergency notification protocol to cause the recipient STA to retransmit user information in the user info element in a subsequent emergency notification frame. In Example 16, the non-transitory computer-readable medium of Example 14, wherein presence of the user info element in each of the three emergency notification frames is a signal for a recipient station (STA) to invoke an emergency notification protocol to cause the recipient STA to retransmit user information in the user info element in a subsequent emergency notification message. In Example 17, the non-transitory computer-readable medium of Example 14, wherein a minimum time period for the predetermined time period is sixty seconds. In Example 18, the non-transitory computer-readable medium of Example 14, wherein a minimum time period for the predetermined time period is a default time period for an unassociated client device to wait between active or passive scanning of all available channels. In Example 19, the non-transitory computer-readable medium of Example 14, the operations further to repeat a process until explicitly terminated via a user interface executing on the one or more processors, the process to scan multiple channels of the one or more bands to identify active channels on the one or more bands; and repeatedly cause transmission of the emergency notification frames for the predetermined time period. In Example 20, the non-transitory computer-readable medium of Example 14, wherein the user info field further comprises a name field for a name of a user of the device, a cell number field for a cellular number for the user of the device, a government ID field for a government issued identifier (ID) for the user, a user ID field for a user ID associated with the user, or a combination thereof. In Example 21, the non-transitory computer-readable medium of Example 14, the operations further to repeatedly cause transmission of the three emergency notification frames on channels 1, 6, and 11 of a lower band for the predetermined time period regardless of whether channels 1, 6, and 11 are identified as active channels, wherein the lower band is 2.4 gigahertz (GHz). In Example 22, the non-transitory computer-readable medium of Example 14, the operations further to repeatedly cause transmission of the three emergency notification frames on the active channels in a channel order based on a priority of each channel of the active channels, wherein the priority of a respective channel is based on a signal strength detected for the respective channel. In Example 23, the non-transitory computer-readable medium of Example 22, the operations further to apply one or more transmission optimizations to transmission of the three emergency notification frames on the respective channel of the active channels based on the signal strength detected on the respective channel. In Example 24, the non-transitory computer-readable medium of Example 23, wherein the one or more transmission optimizations comprise application of a maximum transmission power for emergency notification messages to transmission of the emergency notification frames, application of direct sequence spread spectrum (DSSS)/complimentary code keying (CCK) to transmission of the emergency notification frames, causing transmission of the emergency notification frames at a data rate of one megabits per second, causing transmission of the emergency notification frames with data repetition, causing transmission of the emergency notification frames with header repetition, causing transmission of the emergency notification frames with physical layer preamble repetition, and causing transmission of the emergency notification frames with a maximum guard interval between data symbols wherein the maximum guard interval is defined by an IEEE 802.11 standard applicable to transmission of the emergency notification frames. In Example 25, the non-transitory computer-readable medium of Example 24, wherein the maximum guard interval between data symbols is 3.2 microseconds and the IEEE 802.11 standard applicable to transmission of the emergency notification frames is IEEE 802.11ax-2021.

Example 26 is a method comprising generating emergency notification frames comprising a beacon frame, a probe response frame, and a probe request frame, wherein each of the emergency notification frames comprise a user info element, the user info element comprising a user location field, the user location field comprising a value to identify a current geolocation of the device; scanning multiple channels of one or more bands for communications associated with access point (AP) STAs to identify active channels; and repeatedly causing transmission of the emergency notification frames for a predetermined time period on each of the active channels. In Example 27, the method of Example 26, wherein generation of the emergency notification frames comprises generation of a fourth emergency notification frame, the fourth emergency notification frame comprising a type field with a value indicative of management frame and a subtype field comprising a value indicative of the fourth emergency notification frame, a combination of the value of the type field and the value of the subtype field to signal to a recipient station (STA) to invoke an emergency notification protocol to cause the recipient STA to retransmit user information in the user info element in a subsequent emergency notification frame. In Example 28, the method of Example 26, wherein presence of the user info element in each of the three emergency notification frames is a signal for a recipient station (STA) to invoke an emergency notification protocol to cause the recipient STA to retransmit user information in the user info element in a subsequent emergency notification frame. In Example 29, the method of Example 26, wherein a minimum time period for the predetermined time period is sixty seconds. In Example 30, the method of Example 26, wherein a minimum time period for the predetermined time period is a default time period for an unassociated client device to wait between active or passive scanning of all available channels. In Example 31, the method of Example 26, further comprising repeating a process until explicitly terminated via a user interface of a device that performs the method, the process to scan multiple channels of the one or more bands to identify active channels on the one or more bands; and repeatedly cause transmission of the emergency notification frames for the predetermined time period. In Example 32, the method of Example 26, wherein the user info field further comprises a name field for a name of a user of the device, a cell number field for a cellular number for the user of the device, a government ID field for a government issued identifier (ID) for the user, a user ID field for a user ID associated with the user, or a combination thereof. In Example 33, the method of Example 26, further comprising repeatedly causing transmission of the three emergency notification frames on channels 1, 6, and 11 of a lower band for the predetermined time period regardless of whether channels 1, 6, and 11 are identified as active channels, wherein the lower band is 2.4 gigahertz (GHz). In Example 34, the method of Example 26, further comprising repeatedly causing transmission of the three emergency notification frames on the active channels in a channel order based on a priority of each channel of the active channels, wherein the priority of a respective channel is based on a signal strength detected for the respective channel. In Example 35, the method of Example 34, further comprising applying one or more transmission optimizations to transmission of the emergency notification frame on the respective channel of the active channels based on the signal strength detected on the respective channel. In Example 36, the method of Example 35, wherein the one or more transmission optimizations comprise application of a maximum transmission power for emergency notification messages to transmission of the emergency notification frames, application of direct sequence spread spectrum (DSSS)/complimentary code keying (CCK) to transmission of the emergency notification frames, causing transmission of the emergency notification frames at a data rate of one megabits per second, causing transmission of the emergency notification frames with data repetition, causing transmission of the emergency notification frames with header repetition, causing transmission of the emergency notification frames with physical layer preamble repetition, and causing transmission of the emergency notification frames with a maximum guard interval between data symbols wherein the maximum guard interval is defined by an IEEE 802.11 standard applicable to transmission of the emergency notification frames. In Example 37, the method of Example 36, wherein the maximum guard interval between data symbols is 3.2 microseconds and the IEEE 802.11 standard applicable to transmission of the emergency notification frames is IEEE 802.11ax-2021.

Example 38 is an apparatus comprising a means for performing the method of Examples 26-37.

Example 39 is an apparatus comprising a memory; and logic circuitry coupled with the memory to receive an emergency notification frame comprising a beacon frame, a probe response frame, a probe request frame, wherein the emergency notification frame comprises a user info element, the user info element comprising a location field, the location comprising a geolocation, presence of the user info element to invoke an emergency notification protocol; the emergency notification protocol to cause transmission an emergency notification message based on the emergency notification frame via a non-Wi-Fi communication technology if available; generate three emergency notification frames, the three emergency notification frames comprising a beacon frame, a probe request frame, and a probe response frame, wherein each of the three emergency notification frames comprises the geolocation; scan multiple channels of one or more bands for communications associated with access point (AP) STAs to identify active channels; and repeatedly cause transmission of the three emergency notification frames for a predetermined time period on each of the active channels. In Example 40, the apparatus of Example 39, wherein the logic circuitry comprises baseband processing circuitry and further comprising a radio coupled with the baseband processing circuitry, and one or more antennas coupled with the radio to receive the emergency notification frame. In Example 41, the apparatus of Example 39, wherein generation of the three emergency notification frames further comprises generation of a fourth emergency notification frame, the fourth emergency notification frame comprising a type field with a value indicative of management frame and a subtype field comprising a value indicative of the fourth emergency notification frame, a combination of the value of the type field and the value of the subtype field to signal to a recipient station (STA) to invoke an emergency notification protocol to cause the recipient STA to retransmit user information in the user info element in a subsequent emergency notification frame. In Example 42, the apparatus of Example 39, the logic circuitry to repeatedly cause transmission of the three emergency notification frames in series for the predetermined time period on each active channel. In Example 43, the apparatus of Example 39, wherein the three emergency notification frames each comprise another user info element comprising user information in the user info element of the emergency notification frame received, presence of the user info element to signal to a recipient station (STA) to invoke an emergency notification protocol to cause the recipient STA to retransmit user information in the user info element in a subsequent emergency notification frame. In Example 44, the apparatus of Example 39, the logic circuitry to further output a notification for a user based on the emergency notification frame. In Example 45, the apparatus of Example 39, wherein a minimum time period for the predetermined time period is a default time period for an unassociated client device to wait between scanning of all available channels. In Example 45, the apparatus of Example 39, wherein the user info field further comprises a name field for a name of a user of the device, a cell number field for a cellular number for the user of the device, a government ID field for a government issued identifier (ID) for the user, a user ID field for a user ID associated with the user, or a combination thereof. In Example 46, the apparatus of Example 39, wherein the active channels comprise channels 1, 6, and 11 of a lower band for the predetermined time period by default regardless of whether scanning identifies the channels 1, 6, and 11 as active channels, wherein the lower band is 2.4 gigahertz (GHz). In Example 47, the apparatus of Example 39, the logic circuitry to repeatedly cause transmission of the three emergency notification frames on the active channels in a channel order based on a priority of each channel of the active channels, wherein the priority of a respective channel is based on a signal strength detected for the respective channel. In Example 48, the apparatus of Example 47, the logic circuitry to apply one or more transmission optimizations to transmission of the three emergency notification frames on the respective channel of the channels identified as active channels based on the signal strength detected on the respective channel. In Example 49, the apparatus of Example 48, wherein the one or more transmission optimizations comprise application of a maximum transmission power for emergency notification messages to transmission of the emergency notification frames, application of direct sequence spread spectrum (DSSS)/complimentary code keying (CCK) to transmission of the emergency notification frames, causing transmission of the emergency notification frames at a data rate of one megabits per second, causing transmission of the emergency notification frames with data repetition, causing transmission of the emergency notification frames with header repetition, causing transmission of the emergency notification frames with physical layer preamble repetition, and causing transmission of the emergency notification frames with a maximum guard interval between data symbols wherein the maximum guard interval is defined by an IEEE 802.11 standard applicable to transmission of the emergency notification frames. In Example 50, the apparatus of Example 49, wherein the maximum guard interval between data symbols is 3.2 microseconds and the IEEE 802.11 standard applicable to transmission of the emergency notification frames is IEEE 802.11ax-2021.

Example 51 is a method comprising receive an emergency notification frame comprising a beacon frame, a probe response frame, a probe request frame, wherein the emergency notification frame comprises a user info element, the user info element comprising a location field, the location comprising a geolocation, presence of the user info element to invoke an emergency notification protocol; the emergency notification protocol to cause transmission an emergency notification message based on the emergency notification frame via a non-Wi-Fi communication technology if available; generate three emergency notification frames, the three emergency notification frames comprising a beacon frame, a probe request frame, and a probe response frame, wherein each of the three emergency notification frames comprises the geolocation; scan multiple channels of one or more bands for communications associated with access point (AP) STAs to identify active channels; and repeatedly cause transmission of the three emergency notification frames for a predetermined time period on each of the active channels. In Example 52, the method of Example 51, wherein generation of the three emergency notification frames further comprises generation of a fourth emergency notification frame, the fourth emergency notification frame comprising a type field with a value indicative of management frame and a subtype field comprising a value indicative of the fourth emergency notification frame, a combination of the value of the type field and the value of the subtype field to signal to a recipient station (STA) to invoke an emergency notification protocol to cause the recipient STA to retransmit user information in the user info element in a subsequent emergency notification frame. In Example 53, the method of Example 51, further comprising repeatedly causing transmission of the three emergency notification frames in series for the predetermined time period on each active channel. In Example 54, the method of Example 51, wherein the three emergency notification frames each comprise another user info element comprising user information in the user info element of the emergency notification frame received, presence of the user info element to signal to a recipient station (STA) to invoke an emergency notification protocol to cause the recipient STA to retransmit user information in the user info element in a subsequent emergency notification frame. In Example 55, the method of Example 51, further comprising outputting a notification for a user based on the emergency notification frame. In Example 56, the method of Example 51, wherein a minimum time period for the predetermined time period is a default time period for an unassociated client device to wait between scanning of all available channels. In Example 57, the method of Example 51, wherein the user info field further comprises a name field for a name of a user of the device, a cell number field for a cellular number for the user of the device, a government ID field for a government issued identifier (ID) for the user, a user ID field for a user ID associated with the user, or a combination thereof. In Example 58. The method of Example 51, wherein the active channels comprise channels 1, 6, and 11 of a lower band for the predetermined time period by default regardless of whether scanning identifies the channels 1, 6, and 11 as active channels, wherein the lower band is 2.4 gigahertz (GHz). In Example 59. The method of Example 51, further comprising repeatedly causing transmission of the three emergency notification frames on the active channels in a channel order based on a priority of each channel of the active channels, wherein the priority of a respective channel is based on a signal strength detected for the respective channel. In Example 60. The method of Example 59, further comprising applying one or more transmission optimizations to transmission of the three emergency notification frames on the respective channel of the channels identified as active channels based on the signal strength detected on the respective channel. In Example 61. The method of Example 60, wherein the one or more transmission optimizations comprise application of a maximum transmission power for emergency notification messages to transmission of the emergency notification frames, application of direct sequence spread spectrum (DSSS)/complimentary code keying (CCK) to transmission of the emergency notification frames, causing transmission of the emergency notification frames at a data rate of one megabits per second, causing transmission of the emergency notification frames with data repetition, causing transmission of the emergency notification frames with header repetition, causing transmission of the emergency notification frames with physical layer preamble repetition, and causing transmission of the emergency notification frames with a maximum guard interval between data symbols wherein the maximum guard interval is defined by an IEEE 802.11 standard applicable to transmission of the emergency notification frames. In Example 62. The method of Example 61, wherein the maximum guard interval between data symbols is 3.2 microseconds and the IEEE 802.11 standard applicable to transmission of the emergency notification frames is IEEE 802.11ax-2021.

Example 63 is an apparatus comprising a means for performing the method of Examples 51-62.

The invention claimed is:

1. A device comprising:

memory; and circuitry coupled to the memory, the circuitry configured to:

generate emergency notification frames comprising a beacon frame, a probe response frame, and a probe request frame, wherein each of the emergency notification frames comprise a user info element, the user info element comprising a user location field, the user location field comprising a value to identify a current geolocation of the device;

scan multiple channels of one or more bands for communications associated with access point (AP) STAs to identify active channels; and repeatedly cause transmission of the emergency notification frames for a predetermined time period on each of the active channels.

2. The device of claim 1, wherein the circuitry comprises baseband processing circuitry and further comprising a radio coupled with the baseband processing circuitry, and one or more antennas coupled with the radio to transmit the emergency management frame.

3. The device of claim 1, wherein generation of the emergency notification frames comprises generation of a fourth emergency notification frame, the fourth emergency notification frame comprising a type field with a value indicative of management frame and a subtype field comprising a value indicative of the fourth emergency notification frame, a combination of the value of the type field and the value of the subtype field to signal to a recipient station (STA) to invoke an emergency notification protocol to cause the recipient STA to retransmit user information in the user info element in a subsequent emergency notification frame.

4. The device of claim 1, wherein presence of the user info element in each of the three emergency notification frames is a signal for a recipient station (STA) to invoke an emergency notification protocol to cause the recipient STA to retransmit user information in the user info element in a subsequent emergency notification message.

5. The device of claim 1, wherein a minimum time period for the predetermined time period is sixty seconds.

6. The device of claim 1, wherein a minimum time period for the predetermined time period is a default time period for an unassociated client device to wait between scanning of all available channels.

7. The device of claim 1, the circuitry to repeat a process until explicitly terminated via a user interface of the device, the process to:

scan multiple channels of the one or more bands to identify active channels on the one or more bands; and repeatedly cause transmission of the emergency notification frames for the predetermined time period.

8. The device of claim 1, wherein the user info field further comprises a name field for a name of a user of the device, a cell number field for a cellular number for the user of the device, a government ID field for a government issued identifier (ID) for the user, a user ID field for a user ID associated with the user, or a combination thereof.

9. The device of claim 1, the circuitry to repeatedly cause transmission of the three emergency notification frames on channels 1, 6, and 11 of a lower band for the predetermined time period regardless of whether channels 1, 6, and 11 are identified as active channels, wherein the lower band is 2.4 gigahertz (GHz).

10. The device of claim 1, the circuitry to repeatedly cause transmission of the three emergency notification frames on the active channels in a channel order based on a priority of each channel of the active channels, wherein the priority of a respective channel is based on a signal strength detected for the respective channel.

11. The device of claim 10, the circuitry to apply one or more transmission optimizations to transmission of the three emergency notification frames on the respective channel of the active channels based on the signal strength detected on the respective channel.

12. The device of claim 11, wherein the one or more transmission optimizations comprise application of a maximum transmission power for emergency notification messages to transmission of the emergency notification frames, application of direct sequence spread spectrum (DSSS)/complimentary code keying (CCK) to transmission of the emergency notification frames, causing transmission of the emergency notification frames at a data rate of one megabits per second, causing transmission of the emergency notification frames with data repetition, causing transmission of the emergency notification frames with header repetition, causing transmission of the emergency notification frames with physical layer preamble repetition, and causing transmission of the emergency notification frames with a maximum guard interval between data symbols wherein the maximum guard interval is defined by an IEEE 802.11 standard applicable to transmission of the emergency notification frames.

13. The device of claim 12, wherein the maximum guard interval between data symbols is 3.2 microseconds and the IEEE 802.11 standard applicable to transmission of the emergency notification frames is IEEE 802.11ax-2021.

14. An apparatus comprising:

a memory; and circuitry coupled with the memory to:

receive an emergency notification frame comprising a beacon frame, a probe response frame, a probe request frame, wherein the emergency notification frame comprises a user info element, the user info element comprising a location field, the location comprising a geolocation, presence of the user info element to invoke an emergency notification protocol;

the emergency notification protocol to:

cause transmission an emergency notification message based on the emergency notification frame via a non-Wi-Fi communication technology if available;

generate three emergency notification frames, the three emergency notification frames comprising a beacon frame, a probe request frame, and a probe response frame, wherein each of the three emergency notification frames comprises the geolocation;

scan multiple channels of one or more bands for communications associated with access point (AP) STAs to identify active channels; and repeatedly cause transmission of the three emergency notification frames for a predetermined time period on each of the active channels.

15. The apparatus of claim 14, wherein the circuitry comprises baseband processing circuitry and further comprising a radio coupled with the baseband processing circuitry, and one or more antennas coupled with the radio to receive the emergency notification frame.

16. The apparatus of claim 14, wherein generation of the three emergency notification frames further comprises generation of a fourth emergency notification frame, the fourth emergency notification frame comprising a type field with a value indicative of management frame and a subtype field comprising a value indicative of the fourth emergency notification frame, a combination of the value of the type field and the value of the subtype field to signal to a recipient station (STA) to invoke an emergency notification protocol to cause the recipient STA to retransmit user information in the user info element in a subsequent emergency notification frame.

17. The apparatus of claim 14, the circuitry to repeatedly cause transmission of the three emergency notification frames in series for the predetermined time period on each active channel.

18. The apparatus of claim 14, wherein the three emergency notification frames each comprise another user info element comprising user information in the user info element of the emergency notification frame received, presence of the user info element to signal to a recipient station (STA)

to invoke an emergency notification protocol to cause the recipient STA to retransmit user information in the user info element in a subsequent emergency notification frame.

19. The apparatus of claim 14, the circuitry to further output a notification for a user based on the emergency notification frame based on the emergency notification frame.

20. The apparatus of claim 14, wherein a minimum time period for the predetermined time period is a default time period for an unassociated client device to wait between scanning of all available channels, wherein the active channels comprise channels 1, 6, and 11 of a lower band for the predetermined time period by default regardless of whether scanning identifies the channels 1, 6, and 11 as active channels, wherein the lower band is 2.4 gigahertz (GHz), the circuitry to apply one or more transmission optimizations to transmission of the three emergency notification frames on the respective channel of the channels identified as active channels based on the signal strength detected on the respective channel.

* * * * *